United States Patent
Itoh et al.

(10) Patent No.: US 6,700,989 B1
(45) Date of Patent: Mar. 2, 2004

(54) DEVICE FOR GENERATING, DETECTING, RECORDING, AND REPRODUCING A WATERMARKED MOVING IMAGE HAVING A COPY PREVENTING CAPABILITY AND STORAGE MEDIUM FOR STORING PROGRAM OR THE MOVING IMAGE

(75) Inventors: Hiroyasu Itoh, Kawasaki (JP); Ryota Akiyama, Kawasaki (JP); Toru Nakagawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/045,531

(22) Filed: Mar. 23, 1998

(30) Foreign Application Priority Data

Aug. 29, 1997 (JP) .............................. 9-235069
Sep. 2, 1997 (JP) ............................. 9-237518

(51) Int. Cl.[7] ................................. G06K 9/00
(52) U.S. Cl. ...................... 382/100; 348/460; 386/94; 725/20
(58) Field of Search ............................ 380/50, 51, 57, 380/58, 59, 4, 5, 212, 213, 203; 705/57, 58; 382/232, 233, 236, 100, 250; 386/94; 713/161, 182, 184, 193; 348/460, 461, 462; 725/9, 20, 22

(56) References Cited

U.S. PATENT DOCUMENTS

| | | | | |
|---|---|---|---|---|
| 4,791,669 A | * | 12/1988 | Kage | 380/46 |
| 5,530,759 A | * | 6/1996 | Braudaway et al. | 380/54 |
| 5,546,461 A | * | 8/1996 | Ibaraki et al. | 380/20 |
| 5,651,065 A | | 7/1997 | Stufflet et al. | |
| 5,850,481 A | * | 12/1998 | Rhoads | 382/232 |
| 5,875,249 A | * | 2/1999 | Mintzer et al. | 380/54 |
| 5,915,027 A | * | 6/1999 | Cox et al. | 380/54 |
| 5,960,081 A | * | 9/1999 | Vynne et al. | 380/10 |
| 5,974,141 A | * | 10/1999 | Saito | 380/4 |
| 5,982,977 A | * | 11/1999 | Naruse et al. | 386/64 |
| 6,005,936 A | * | 12/1999 | Shimizu et al. | 380/4 |

FOREIGN PATENT DOCUMENTS

| | | | | |
|---|---|---|---|---|
| JP | 9163339 | * | 6/1997 | .......... H04N/7/167 |
| WO | WO97/13248 | | 4/1997 | |

OTHER PUBLICATIONS

European Patent Office, European Office Action, Mar. 3, 2003, pp. 1–3.
Chiou–Ting Hsu et al.; "Digital Watermarking for Video"; Proceedings of 13th International Conference on Digital Signal Processing, Jul. 2–4, 1997; vol. 1, pp. 217–220.
European Search Report for EP 98 302407.

* cited by examiner

Primary Examiner—Samir Ahmed
(74) Attorney, Agent, or Firm—Staas & Halsey LLP

(57) ABSTRACT

The present invention relates to a contrivance for inserting watermark information into a moving image. The watermark information indicative of the ownership of the copyright of the moving image is inserted into the frames of the moving image at irregular intervals, the frames being of such a number that the watermark information is visually unperceivable in the moving image. In addition, the insertion positions of the watermark information in the frames are determined on the basis of random number values. Besides, restrictive information for the copying of the moving image is inserted together with the watermark information. When the moving image has been brought to a standstill into a static image, the watermark information can be visually perceived with ease, so that illegality such as piracy can be readily exposed. Thus, the present invention can provide a simple and inexpensive scheme for the copyright protection of the moving image.

27 Claims, 33 Drawing Sheets

| COPY CONTROL MODE | PROCESS FOR VIDEO RECORDING REQUEST | PROCESS FOR REPRODUCTION REQUEST |
|---|---|---|
| one-copy | RECORDING PERMITTED A NEW DISK FOR RECORDING IS SET IN THE NO-MORE-COPY | REPRODUCTION PERMITTED |
| no-more-copy | RECORDING REJECTED | REPRODUCTION PERMITTED |
| never-copy | RECORDING REJECTED | REPRODUCTION PERMITTED |

F I G. 1

```
┌──────── STORAGE DEVICE ─────────────────┐
│  ┌──────────────────────────────────┐   │
│  │ FILE CONTROL TABLE               │   │
│  │     FILE NAME                    │   │
│  │     FORMAT OF FILE(RECORD SIZE, ETC.) │
│  │     SIZE OF FILE                 │   │
│  │     .....                        │   │
│  │ WATERMARK CONTROL INFORMATION ITEMS (ALL BEING │
│  │ ENCRYPTED)                       │   │
│  │     INFORMATION OF MOVING IMAGE FILE : Mx,My,N │
│  │     IMAGE OF WATERMARK : Lx,Ly,IMAGE ITSELF, │
│  │     AVERAGE INTERVAL OF WATERMARK INSERTION: n, │
│  │     INSERTION NUMBER OF PIECES OF WATERMARK │
│  │     PATTERN: N/n,                │   │
│  │     PSEUDORANDOM NUMBER GENERATION FUNCTION : │
│  │                              RANU, │
│  │     SEED OF RANDOM NUMBER GENERATION : S [0] , │
│  │     SX [0] ,SY [0]               │   │
│  └──────────────────────────────────┘   │
│       ┌──────────────────────────────┐  │
│       │   WATERMARKED DYNAMIC IMAGE  │  │
│       │                              │  │
│       │   N FRAMES IN ALL            │  │
│       │                              │  │
│       └──────────────────────────────┘  │
└─────────────────────────────────────────┘
```

F I G. 1 4

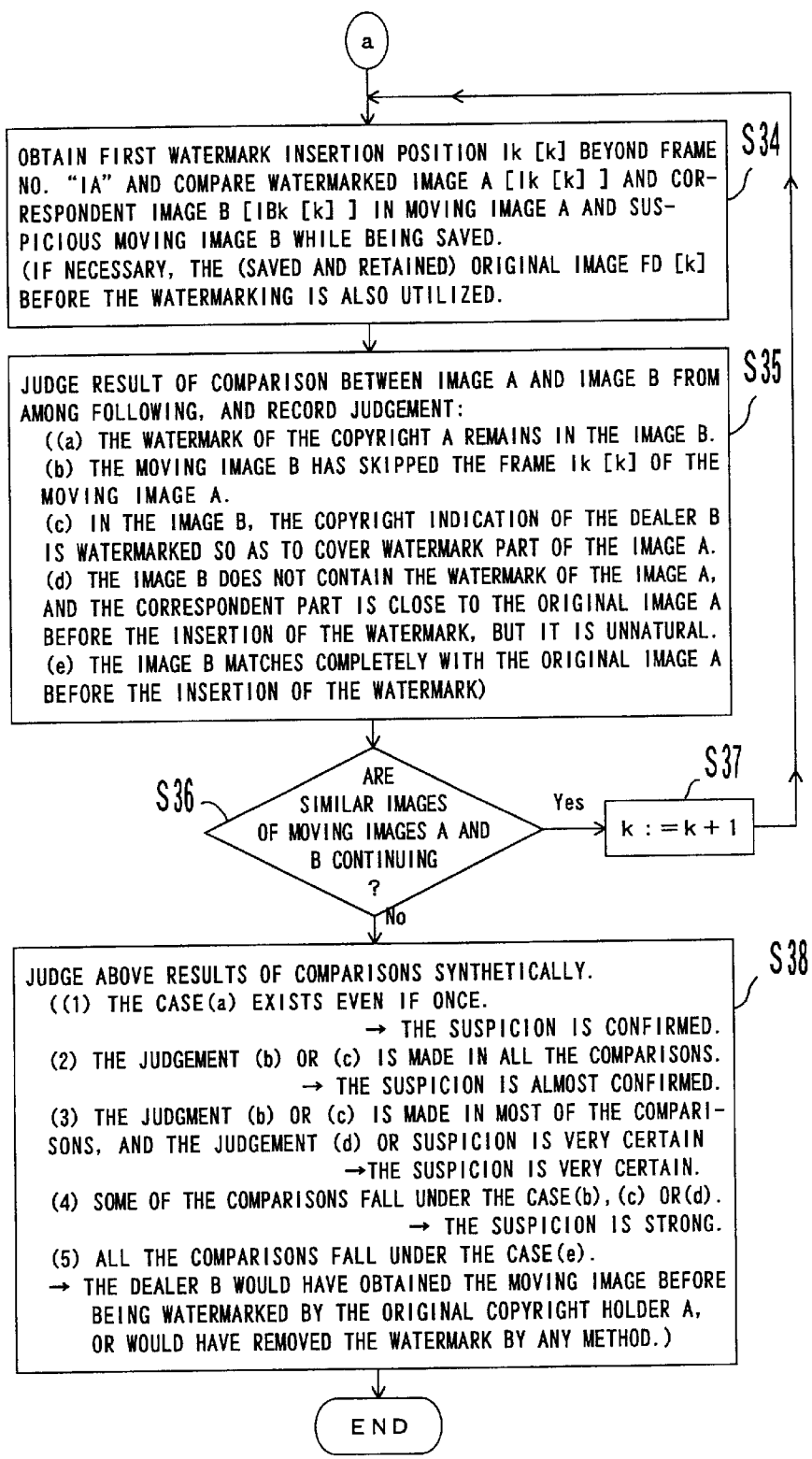
F I G. 2 2

| k | | | | | | | | | | |
|---|---|---|---|---|---|---|---|---|---|---|
| ...102 | a | b | b | c | c | c | c | c | c | e |
| 103 | a | b | | c | c | | c | d | d | e |
| 104 | a | a | b | c | c | d | e | e | e | e |
| 105 | a | b | b | c | d | e | e | e | e | e |
| 106 | a | b | b | c | d | d | d | d | d | e |
| 107 | a | a | b | c | c | a | c | c | d | d |
| 108 | a | b | b | c | c | c | c | c | d | d |
| 109 | a | b | b | c | d | c | c | c | e | e |
| 110 | a | b | b | c | e | e | e | e | e | e |
| 111 | a | b | b | c | e | e | e | e | e | e |
| 112 | a | b | b | c | d | e | e | e | e | e |

SYNTHETIC DECISION ⇒ (1) (2) (2) (3) (1) (4) (4) (4) (5)

FIG. 23

| COPY CONTROL MODE | DISPOSAL FOR VIDEO RECORDING REQUEST | DISPOSAL FOR REPRODUCTION REQUEST |
|---|---|---|
| any-copy | RECORDING PERMITTED | REPRODUCTION PERMITTED |
| one-copy | A NEW DISK FOR RECORDING IS SET IN THE any-copy | REPRODUCTION PERMITTED |
| no-more-copy | RECORDING REJECTED | REPRODUCTION PERMITTED |
| never-copy | RECORDING REJECTED | REPRODUCTION PERMITTED |

FIG. 24

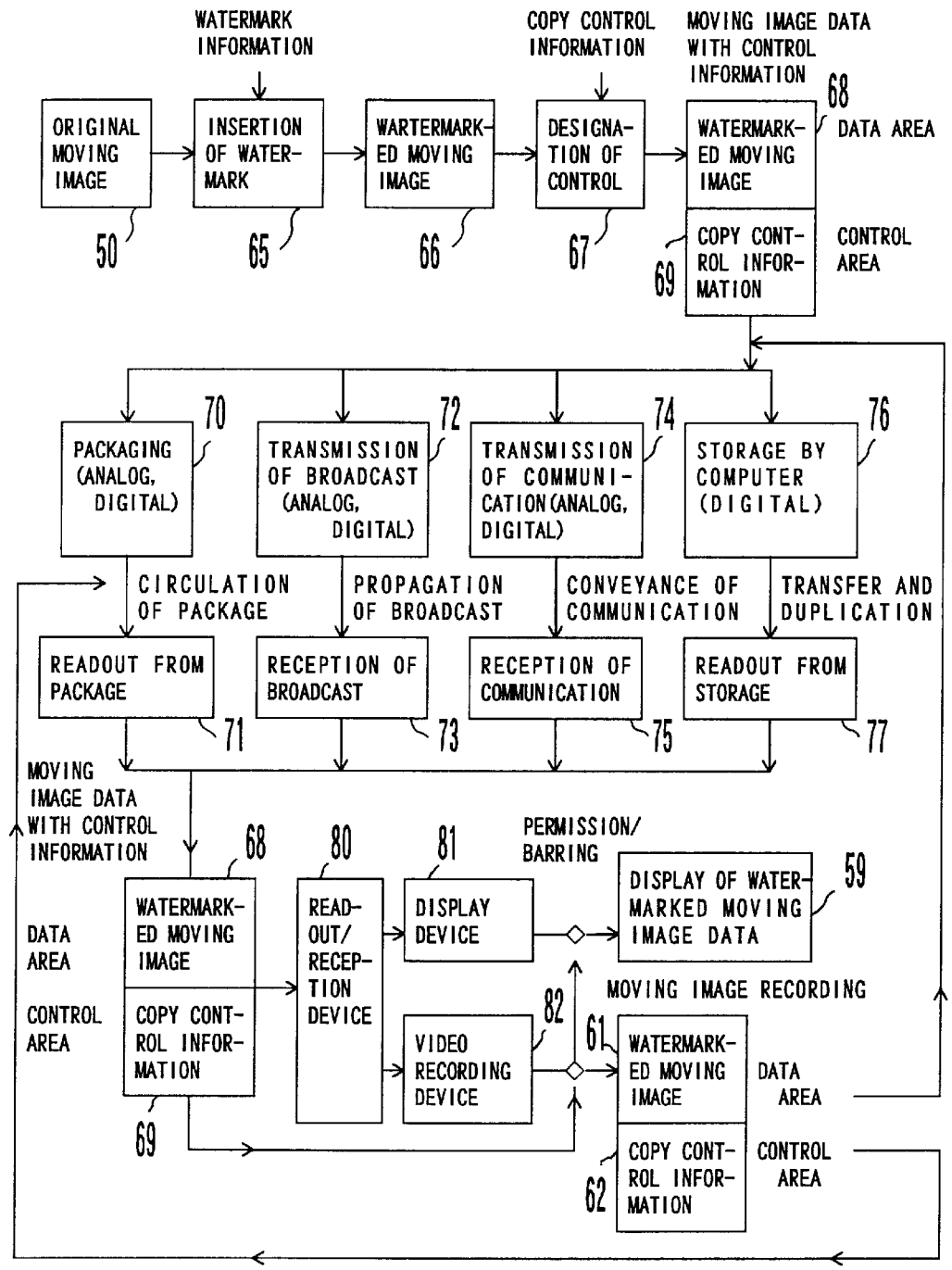
F I G. 27

| COPY CONTROL MODE | COPY CONTROL CODE | DISPOSAL FOR VIDEO RECORDING REQUEST/CODE OF CHILD | DISPOSAL FOR REPRODUCTION REQUEST |
|---|---|---|---|
| any-copy | 0 0 | RECORDING PERMITTED / 00 | REPRODUCTION PERMITTED |
| one-copy | 0 1 | RECORDING PERMITTED / 10 | REPRODUCTION PERMITTED |
| no-more-copy | 1 0 | RECORDING REJECTED / — | REPRODUCTION PERMITTED |
| never-copy | 1 1 | RECORDING REJECTED / — | REPRODUCTION PERMITTED |

FIG. 28

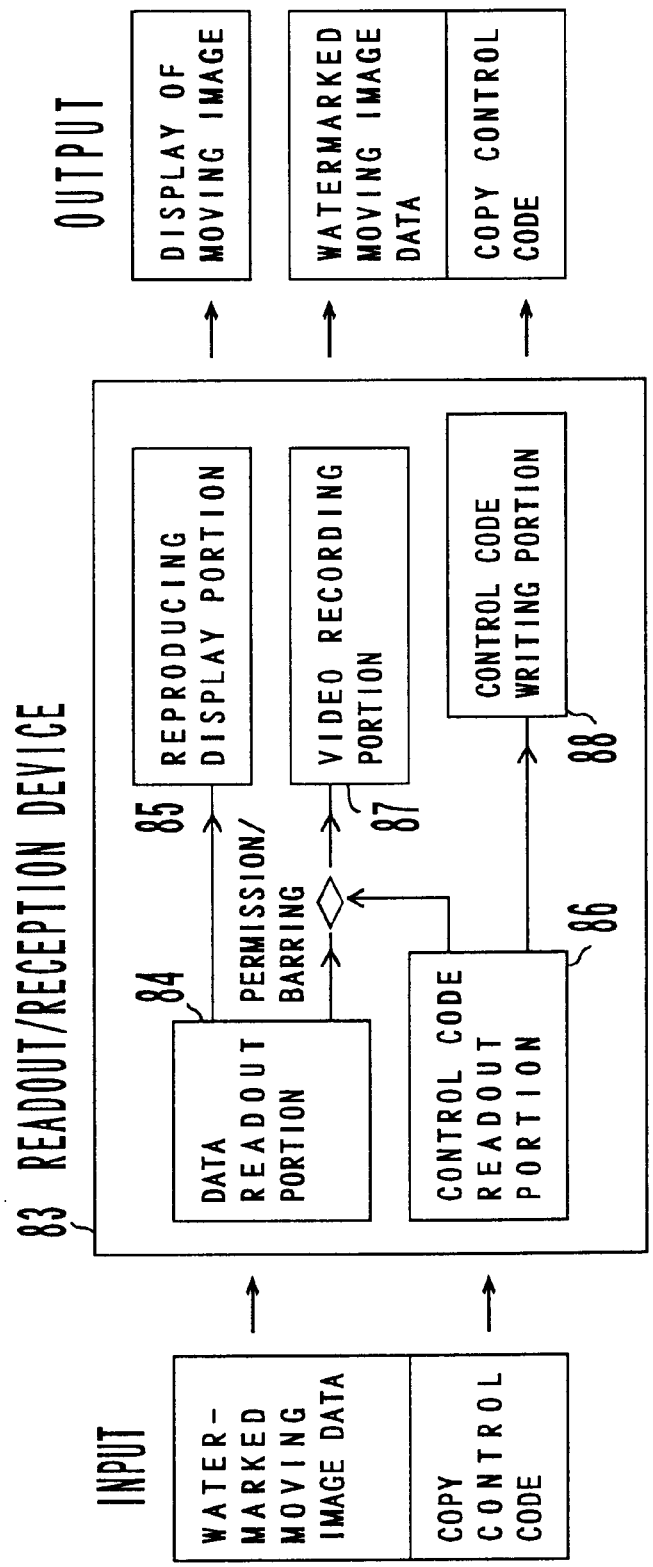
F I G. 29

SH: Sequence header
GOP: Group of pictures

DEVICE FOR GENERATING, DETECTING, RECORDING, AND REPRODUCING A WATERMARKED MOVING IMAGE HAVING A COPY PREVENTING CAPABILITY AND STORAGE MEDIUM FOR STORING PROGRAM OR THE MOVING IMAGE

BACKGROUND OF THE INVENTION

1. Field of the Invention

The present invention relates to the processing of moving images. More particularly, it relates to technologies for inserting watermarks into moving images which are distributed as being accumulated and recorded in package type media, that is, moving images whose storage media are a video tape, a CD-ROM, an MO, a DVD, etc. Also, it relates to technologies for inserting and detecting watermarks into and from moving images of distributed network type distribution or broadcast type distribution, that is, moving images which are transmitted by the Internet, digital CATV and digital satellite broadcast. Further, it relates to technologies for copyright administration services for the moving images which are supplied by the above two distribution methods, and technologies for watermark information authentication services by third parties. More concretely, it relates to an insertion system, an insertion method and a storage medium which are applicable to the technologies mentioned above.

The present invention relates also to copy prevention technology concerning copyright protection.

The technical background which has given birth to the present invention is a situation where anybody can duplicate and edit a work by utilizing a personal computer, owing to the spread of digitization, the popularization of the Internet and the extensive uses of CDs, MOs, DVDs etc., and where problems concerning copyrights have become serious more and more. In order to prevent any illicit copy, therefore, the application of electronic watermark technology to moving images has become indispensable.

2. Description of the Related Art

The present invention deals with the protection of the copyright of moving image information which is circulated or distributed in the form of a package medium or which is transmitted in the form of broadcast, communication or the like. Owing to the recent innovation and mergence of techniques whose core is digitization, the moving image information has been extensively circulated, and the duplication and editing thereof have become easy. Accordingly, the protection of the copyright has become an important theme.

The forms in which the moving image information is circulated or transmitted, include the following:

(a) Analog moving image packages: Cinema, video tape, etc.

(b) Digital moving image packages: CD-ROM, MO, DVD, etc.

(c) Analog moving image broadcasts: Ground wave broadcast, cable TV, satellite broadcast, etc.

(d) Digital moving image broadcasts: Digital TV, digital cable TV, digital satellite broadcast, etc.

(e) Digital moving image communications: Internet communications, etc.

All of these technical fields handle moving images as their contents. Recently, the analog form and the digital form of identical content are converted between each other, and the package, broadcast and communication are employed in optional connections with one another. Especially, a digitized moving image can be readily duplicated into a noiseless copy, and it can be readily edited by a personal computer or the like. Therefore, how the copyright is protected is the important theme at present. Concretely, there are such subjects as whether the duplication is permitted or rejected in the first place, and how piracy is prevented.

Mentioned as prior-art techniques relevant to these subjects are the following:

(1) Scheme wherein, using copy restriction codes, the video recording duplication and reproduction display of moving image information stored in a package medium are permitted or barred in the drive of the medium.

(2) Scheme wherein the storage area of a package medium is divided into a data storage area for storing moving image data therein, and a control storage area for storing control information therein, the latter of which is protected hardware-wise, thereby to prevent the moving image data from being altered by general users.

(3) Scheme (such as MPEG) wherein a digital moving image is subjected to data compression so as to store or transmit the compressed data.

(4) Scheme wherein, in transmitting a moving image, it is encrypted in order that only specific allowed recipients may be able to decrypt the transmitted moving image.

(5) Scheme wherein a watermark camouflaged so as to be visually unperceivable (an invisible watermark) is inserted into the data of a moving image so as to transmit or circulate the resulted moving image.

Even with these schemes, however, a satisfactory scheme for the copyright protection has not hitherto been established yet. This is also obvious from "Call for Proposals" issued under the date of Jul. 1, 1997 by the Data Hiding SubGroup (DHSG) of the Copy Protection Technical Working Group (CPTWG). The call for proposals invites public contributions of those proposed desirable schemes for the copyright protection which employ various "watermark" techniques conforming to the above scheme (5) and which realize the permission and barring of video recording/reproduction in the above scheme (1).

Note: "Call for Proposals", Data Hiding SubGroup, Copy Protection Technical Working Group, Version 1.0, Jul. 1, 1997 was available on the World Wide Web at www.dvcc.com/dhsg.

The CPTWG is an association of traders concerned with digital video recording and reproduction, and technologies to be standardized in the trade are taken up here. Such a technology represents a present-day technological level in the field concerned. The proposals to the DHSG which is one of the subgroups of the CPTWG will contribute to the technical standard of the field concerned. Concretely, after being studied as a more comprehensive technology by the DTDG which is another subgroup, the proposals are expected to be reflected in the standard of a secure bus termed "IEEE1394".

The present invention complies also with the Call for Proposals. In this regard, the prior art of electronic watermarking will be stated below.

There have hitherto been practiced copyright administration services for still images and music that utilize electronic watermarks. The electronic watermarking technique in the prior art is such that the ID of a copyright holder, the ID of image data, the ID of the recipient of the image data, the ID of a dealer mediating circulation, the ID of a user, etc. are embedded in accordance with the kind of the digital work. As an expedient for the technique, the image is circulated through the path of the Internet, and the ID numbers are open to anybody. By way of example, products "PictureMarc" (Digimarc Corporation in the U.S.) and "FBI Pro" (High Water Signum Ltd. in the U.K.) correspond to the expedient. As another expedient, the image is circulated by utilizing the Internet or the like, and the ID numbers are managed by key data. By way of example, products "SysCop" (Fraunhofer Center for Research Computer Graphics in the U.S.), "Tiger Marc Image/Data Blade" (NEC America in the U.S.) and "Argent" (Dice Co. in the U.S.) correspond to this other expedient.

Regarding researches on copyright administration schemes for moving images that utilize electronic watermarks, various methods in which a bandwidth compression technique (MPEG2) for the moving image is combined with the electronic watermarking have been proposed, and they are basically classified into two types. The first of these types is a data hiding scheme wherein electronic watermark information is inserted in a spatial frequency region so as to, spread the watermark information in a broad spectrum region. The second type is a scheme wherein the electronic watermark is superposed on and inserted into sampled value regions of two dimensions or three dimensions. With the first type, the watermark information is difficult to remove, so that the intensity of the watermarking is high, but the image quality or tone quality of the original data degrades conspicuously. Moreover, frequencies need to be converted twice (as conversion and inversion). Therefore, the burden of processing on the first type is heavier than that on the second type wherein the watermark is embedded in the sampled value regions. Accordingly, the first type requires dedicated hardware. The basic technical themes of the electronic watermarking are (1) that the watermark information is embedded with the degradation to the image quality or the tone quality avoided to the utmost, and (2) that the embedded watermark information is made difficult to remove to the utmost.

In the scheme wherein the watermark information is embedded in the frequency components, it is embedded in the high frequency components of those parts of image data or voice data whose changes are inconspicuous to the human eye, for example, the parts of the hair of the head and the contour of an object, in order to suppress the degradation. When the quantity of the watermark information data to be embedded is increased and is spread in the principal components of the original data, the intensity of the electronic watermarking becomes high. However, when the spread of the watermark information is too broad, the image quality or the tone quality degrades. Moreover, the watermark sometimes disappears or deteriorates due to MPEG encoding/decoding.

Also in the scheme wherein the watermark information is embedded in the sampled value regions, it is embedded in redundant parts so as not to be seen or heard as noise. By utilizing the visual characteristics and aural characteristics of man, the quantity of watermark data to be embedded in the redundant parts is made large, and the quantity of the watermark information in the principal parts of the content is made small. Thus, the watermark information is embedded inconspicuously.

There are also different schemes wherein watermark information is embedded by utilizing the existing techniques for image bandwidth compression. By way of example, Fraunhofer CRCG (in U.S.) has developed the scheme wherein, in embedding the watermark information in the process of the compression of the JPEG, that is, at the stage of linear quantization, a medium frequency coefficient among DCT output coefficients is varied, and the variation is used as the watermark information. Besides, NTT (in Japan) or NEC (in Japan) has developed the scheme wherein, when the conversion coefficient of DCT is to be linearly quantized, a coefficient value is changed little by little so as to form the watermark information. In addition, Mitsubishi Denki (in Japan) is developing conjointly with Kyushu University (in Japan), electronic watermarking which employs wavelet conversion. Kyoto Institute of Technology (in Japan) has proposed the scheme wherein the watermark information is embedded in the moving vectors of MPEG. Concretely, a table in which the watermark bits of 100 bits are held in correspondence with the individual moving vectors existent in the number of 330 per frame, is prepared as secret information at each of transmission and reception ends. It is secretly utilized as a code table to check whether the watermark information is true or false.

Straightforwardly, problems to be solved by the present invention are stated in the Call for Proposals made by the CPTWG/DHSG. In the Call for Proposals, a recording system in the package medium of a moving image and a transmission system in broadcast/communication which satisfy the following specifications are mentioned as below:

Aims: Permitting a content offerer to put a "DHS watermark" indicative of copyright into a digital video medium, for the purposes of identifying the copyright and preventing illegal video recording and reproduction. Here, it is especially intended to prevent a consumer from easily copying the moving image the duplication of which is prohibited.

A digital video equipment in the future will incorporate this standard and will function so as to reject illicit video recording and reproduction. Although this standard is chiefly directed toward DVDs, it is similarly applicable to other video applications (for example: satellite broadcast, cable television, etc.).

The specifications of copy restrictions include three kinds of modes, which are shown in FIG. 1. In addition, the following points are requested as properties/capabilities which the new systems are to possess:

(1) When the moving image is reproduced and displayed, a viewer does not have an offensive feeling.
(2) The copy restriction mode is easily detected by a video recording/reproduction device.
(3) The digital detection of the DHS watermark is easy in various areas (moving image data, compressed data, transmission data, sector data, etc.).
(4) Household video equipment can detect the one-copy mode, and can set a new disk for recording to the no-more-copy mode.
(5) The erroneous rejection of recording is reduced.
(6) The detection rate of the "DHS watermark" is high (for example, at least 50%).
(7) The DHS watermark is held in ordinary video processing which is executed by a viewer.
(8) A license is allowed under reasonable conditions.
(9) The new systems can be exported to and imported from Japan, U.S.A., Europe, and other countries.
(10) The new systems are technologically mature, and can be demonstrated.
(11) Owing to the DHS watermark, the three kinds of copy control modes can be detected continuously anytime.
(12) The DHS watermark can be inserted efficiently by real-time processing.
(13) An encoder/decoder for the DHS watermark is capable of processing at a DVD operation speed.

The present invention is intended to incarnate a more excellent scheme for copyright protection by meeting the above aims and the specifications relevant to the three kinds of copy control modes.

The problem of the prior art concerning electronic-watermark insertion techniques is as explained below. Even in the prior-art schemes, it is aimed at to embed the watermark information with the degradation of the image quality or the tone quality avoided to the utmost, and to make the embedded watermark information difficult of removal to the utmost. These aims, however, incur the problem that considerably complicated processing is necessitated, but that a simple and inexpensive method or the insertion is not existent.

SUMMARY OF THE INVENTION

The present invention has for its object to facilitate, for example, the detection of an illicit copy by a watermark insertion scheme of simple construction and low cost in which a visible watermark being visually perceivable in a still image and being visually unperceivable in a moving image is inserted into the moving image. That is, the object of the present invention is to provide a contrivance for protecting copyright in such a way that the indication of the copyright of a moving image, for example, is inserted as a watermark, thereby making it possible to readily expose illegality such as the piracy of the image.

A watermark insertion device according to the present invention is premised on the insertion of watermark information into a moving image composed of a plurality of frames, and it comprises a frame selection unit and a watermark-information insertion unit.

The frame selection unit selects frames into which the watermark information is to be inserted, at irregular intervals from among the plurality of frames. The selection of the frames is effected in such a way that the frames are determined by the use of, for example, random number values which are generated under a controlled condition.

The watermark-information insertion unit inserts the watermark information into the selected frames.

The watermark information to be inserted has, for example, a size which is large enough to visually perceive this watermark information when the moving image is brought to a standstill (into a static image). The number of the frames into which the watermark is to be inserted, is set so that the inserted watermark may not be recognizable in the moving image.

Besides, the watermark insertion device according to the present invention can be so constructed as to further comprise a moving-image storage unit for storing therein the moving image in which the watermark information has been inserted, together with information indicative of the frames in which the watermark has been inserted, or information indicative of the controlled condition which serves for the frame selection unit to select the frames. Also, the moving-image storage unit can be so constructed as to further store therein information indicative of those positions in the frames at which the watermark has been inserted, or a condition for generating random number values which the watermark-information insertion unit uses for determining the insertion positions.

Also, the watermark insertion device according to the present invention can be so constructed as to further comprise a copy-restriction-information insertion unit by which information indicative of a restriction on the copying of the moving image is inserted into an area where control data for the moving image are recorded.

Moreover, the present invention shall cover within its scope a method of generating the moving image in which the watermark is inserted, a storage medium which stores therein the moving image or a program for implementing the functions of the above device by means of a computer, and an apparatus which reproduces the contents of the storage medium.

According to the present invention, a simple and inexpensive scheme for the copyright protection of the moving image can be provided.

BRIEF DESCRIPTION OF THE DRAWINGS

FIG. 1 is a table showing the specifications of copy control modes which conform to the CPTWG/DHSG;

FIG. 14 is a diagram showing a moving image file in which control information is encrypted and borne;

FIGS. 21 and 22 are flowcharts showing a process for verifying copyright against a moving image of suspected plagiary;

FIG. 23 is a diagram for explaining examples of synthetic decisions on the plagiary of the moving image;

FIG. 24 is a table showing four kinds of copy control modes;

FIG. 27 is a diagram for explaining a copyright protection scheme which employs both copy restriction information and watermark information;

FIG. 28 is a table exemplifying copy control codes which serve to realize the copy control modes;

FIG. 29 is a block diagram showing the structure of a readout/reception device;

DESCRIPTION OF THE PREFERRED EMBODIMENTS

Figure 2:
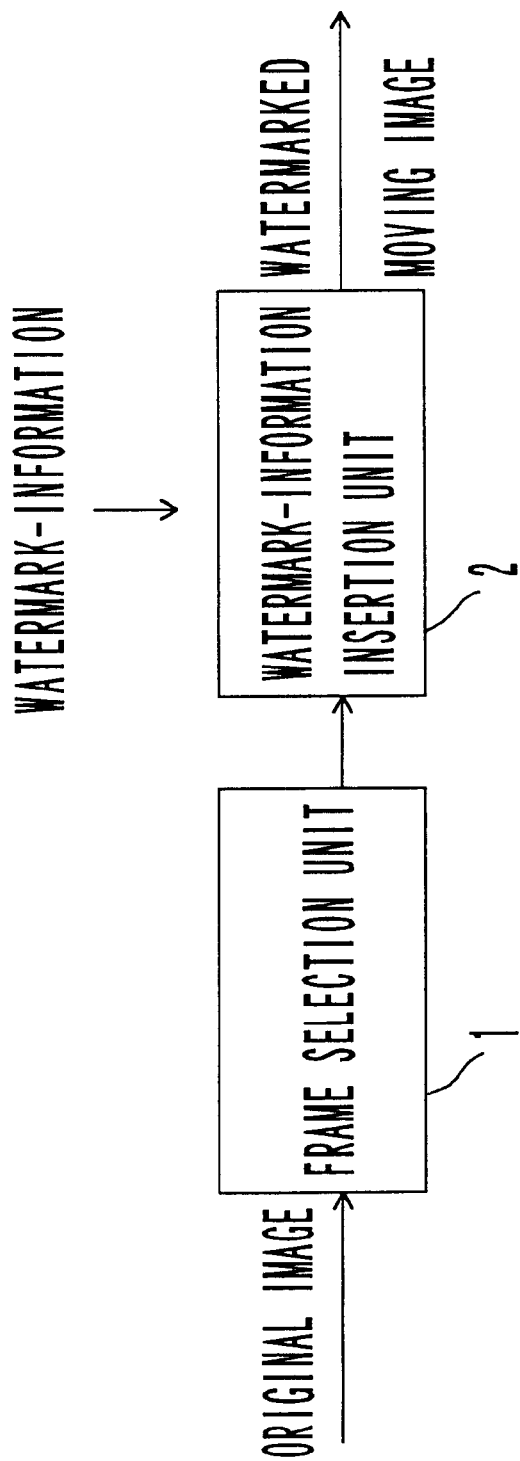
FIG. 2 is a block diagram showing the fundamental construction of the present invention.

FIG. 2 is a block diagram showing the first fundamental construction of the present invention. In more detail, the figure illustrates the fundamental construction of a device for inserting a visible watermark intended for a moving image, in which the visible watermark being visually perceivable in a still state is inserted into the moving image composed of a plurality of frames.

Referring to FIG. 2, a frame selection unit 1 selects frames into which watermark information is to be inserted. It selects the frames at such intervals that, when the watermark information has been inserted into some of the plurality of frames constituting the original image, it is visually unperceivable on the resulting moving image. The intervals are determined using, for example, a pseudorandom number function under a controlled condition.

A watermark-information insertion unit 2 inserts the watermark information being visually perceivable in the still state, into the frames into which the watermark information is to be inserted and which have been selected by the frame selection unit 1. Those positions in the frames at which the watermark information is to be inserted, are determined using a pseudorandom number function under a controlled condition by way of example.

The watermark which is inserted in the present invention, is visually perceivable in a still image. However, the number of the frames into which the watermark is inserted is comparatively small, and it is set at a rate of, for example, one in 5 seconds. Moreover, the intervals of the watermark insertion is not regular, but the watermark is inserted into the frames of irregular intervals. Thus, the watermark is visually unperceivable in the moving image. In the ensuing description, such a watermark shall be called the "visible watermark".

Even when the frames into which the visible watermark is to be inserted are set at a rate of, for example, one to 100, the number of each frame to have the watermark inserted thereinto, in other words, the position of each frame among the 100 frames is determined at random. Besides, the insertion position of the watermark information in each frame is determined at random. In consequence, enormous labor is expended in detecting all of the frames which have been selected at the irregular intervals and in which the watermark information has been inserted at the random positions, from among the large number of frames which constitute the moving image as a whole. Even when the piracy of the moving image is intended, a considerably difficult job is involved in the detection and alterations of the watermark information, for example, copyright information as based on searches for all the frames bearing the information.

In one aspect of performance of the present invention, information items obtained by encrypting the numbers of the frames in which the watermark information is inserted and those positions in the frames at which the watermark information is inserted, can be stored and kept together with the moving image in which the watermark information is inserted. Alternatively, it is possible to store and keep information obtained by encrypting the controlled condition for randomly selecting the frame numbers of the frames into which the watermark information is to be inserted, and/or the controlled condition for randomly determining those positions in the frames at which the watermark information is to be inserted. Thus, in a case, for example, where a copyright problem has occurred, the places in which the copyright information in the form of the watermark information has been inserted can be definitely pointed out, and this can serve for the legal settlement of the copyright problem.

In another aspect of performance, partial images which are hidden by the watermark information in the frames because of the insertion of the watermark information can be stored and kept. It is accordingly permitted to restore the perfect original image including the partial images, by combining the stored partial images with the above stored results of the numbers of the frames bearing the inserted watermark information and the insertion positions of the watermark information in the frames.

In addition, the functions of the units in the present invention can be implemented by causing a computer to run a computer program. According to the present invention, the visible watermark is inserted into the moving image by the watermark insertion system. The resulting moving image or the above computer program is stored in any of various storage media such as a video tape, CD-ROM, MO and DVD, so as to distribute the storage medium in the market by way of example. In that sense, the storage medium which stores therein the moving image bearing the inserted visible watermark or the computer program for creating the watermarked moving image is also realized for the first time by the present invention.

Further, according to the present invention, a medium drive (for example, a DVD drive) is enabled to permit or bar the video recording or duplication of the moving image, in such a way that a copy restriction code is previously recorded in a control-data storage area within the moving-image storage medium or within communication data. Moreover, in the data area of the moving image, the information expressive of the copyright of the moving image work is embedded in the large number of frames constituting the moving image in order that the copyright indication may not visually recognized in an ordinary moving-image display (such as projection on a screen), and that it may be visually perceivable clearly in a frame feed display. Thus, illegality such as piracy can be exposed or can be prevented from occurring. The effects of the present invention are not spoilt by any of various converting operations (duplication, A-D/D-A conversion, compression/expansion, encryption/ decryption, etc.) in the cases of transmitting and utilizing the moving image.

Figure 3:
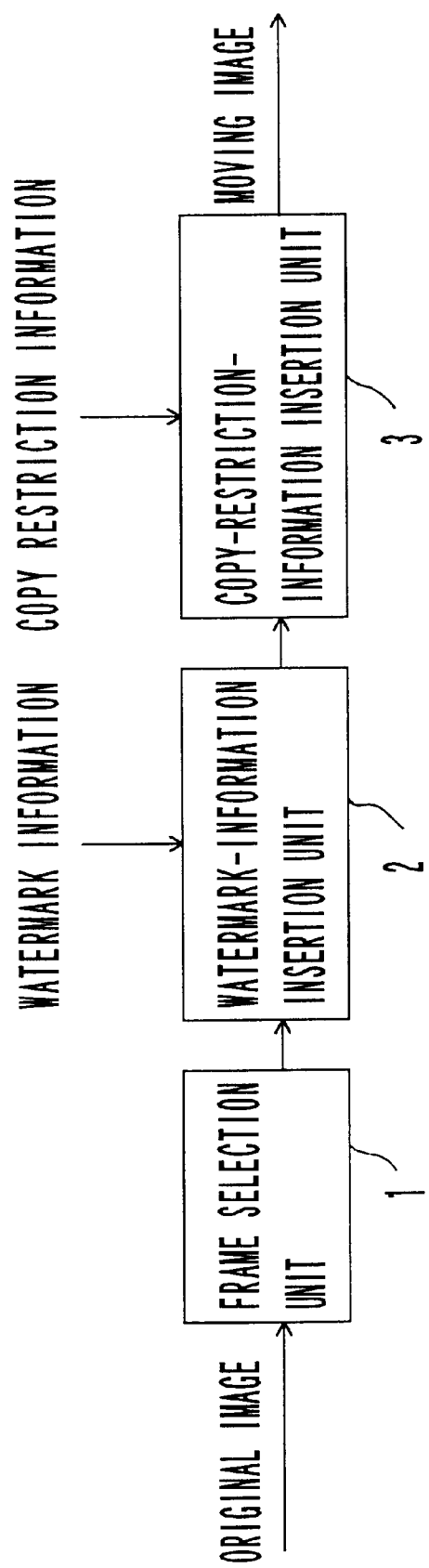
FIG. 3 is a block diagram showing the second fundamental construction of the present invention.

FIG. 3 is a block diagram showing the second fundamental construction of the present invention. As compared with FIG. 2, FIG. 3 differs in the point that a copy-restriction-information insertion unit 3 is added. The copy-restriction-information insertion unit 3 records the copy restriction conditions of a moving image, that is, the permission or rejection of the creation of one or more copies, the allowable number of copies in the case of the permission, etc., in an area in which various control data are recorded for a plurality of frames constituting the moving image, for example, which is protected from an alteration by a user, unlike an area in which moving image data themselves are recorded.

The fundamental construction shown in FIG. 3 operates in a sequence in which the copy restriction information is inserted after watermark information, for example, copyright indication has been inserted by a watermark-information insertion unit 2 into the frame which had been selected by a frame selection unit 1. However, the aspect of performance of the present invention is not restricted to the exemplified sequence, but it is also possible to insert the watermark information after the insertion of the copy restriction information or to simultaneously insert the copy restriction information and the watermark information.

The moving image in which the watermark information and the copy restriction information have been inserted in accordance with the present invention, is stored in any of various storage media and is distributed in the market, likewise to the moving image in which only the visible watermark has been inserted.

The moving image created in the present invention is delivered to the hands of a consumer by way of example, in the form of, for example, any storage medium, and it is reproduced or recorded (for duplication). On this occasion, according to the present invention, the execution of the video recording is controlled hardware-wise on the basis of the contents of the copy restriction information.

More specifically, according to the present invention, a video recording/reproducing apparatus for the moving image decides the contents of the copy restriction information hardware-wise or software-wise, and it determines whether the video recording is rejected or executed, in accordance with the decided results. The contents of the copy restriction information include the permission or rejection of the duplication and the number of duplicatable copies (children) as mentioned before. As a further content, it is possible to designate, for example, a condition for re-duplicating or recopying the duplicated moving image, in other words, the number of generations.

As thus far described, according to the present invention, the visible watermark and the copy restriction information are inserted into the moving image composed of the plurality of frames, thereby to facilitate the prevention and detection of any illicit copy.

There will now be described an aspect of performance for inserting watermark information in the present invention in correspondence with the fundamental construction shown in FIG. 2.

Figure 4:
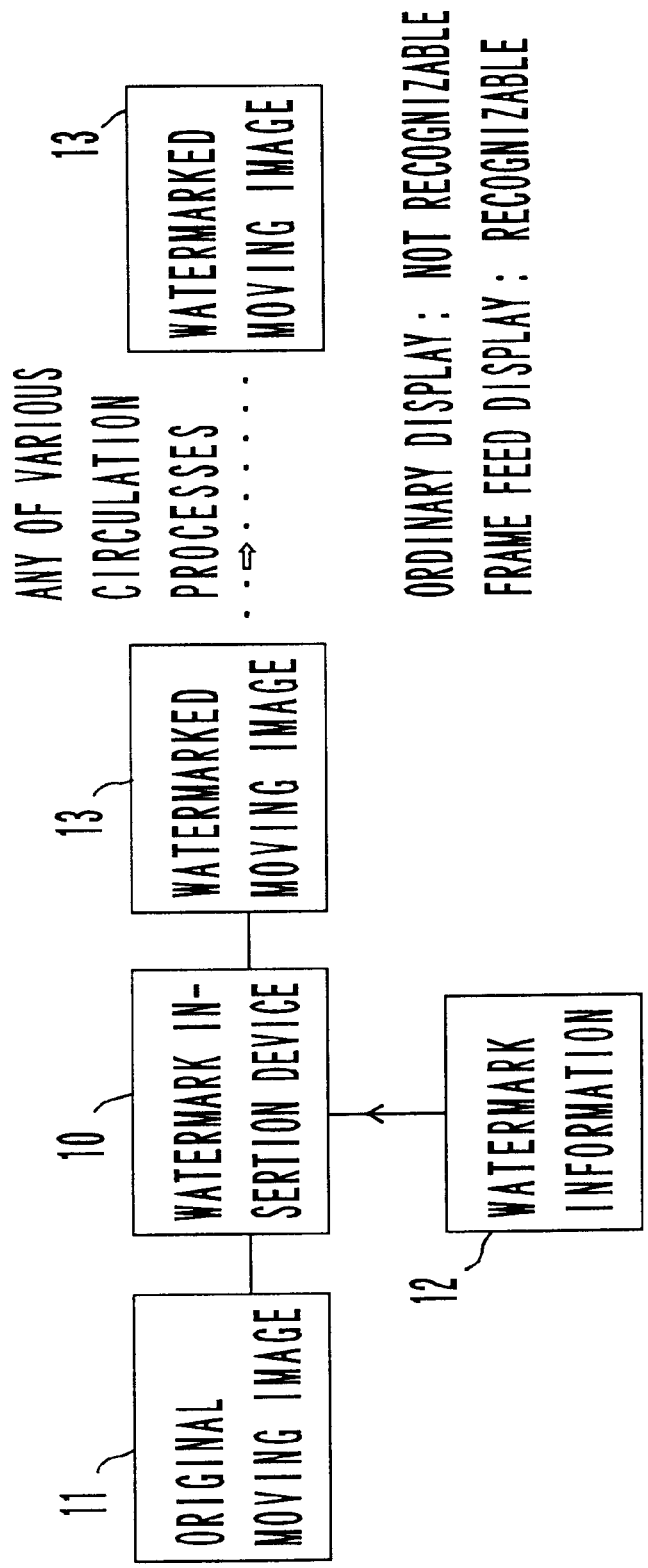
FIG. 4 is a diagram for explaining the basic operations of a device for inserting a visible watermark intended for a moving image.

FIG. 4 is a diagram for explaining the basic operations of a system for inserting the visible watermark intended for a moving image, in this aspect of performance. Referring to the figure, the watermark insertion device 10 of the present invention creates a watermarked moving image 13 in such a way that watermark information 12 is inserted into the frames of the original image 11 of the moving image as have been selected at irregular intervals, in the form in which the watermark information 12 is visually perceivable clearly in a still image, but it is not visually recognizable in the moving image. The watermarked moving image 13 is sent to the side of a user via any of various circulation processes, and it is reproduced using, for example, a video playback apparatus on the user side. The watermark cannot be recognized in an ordinary reproduction mode, whereas it can be recognized in frame feed reproduction or in slow reproduction.

In the present invention, naturally any watermark information can be employed as the visible watermark which is to be inserted into the original moving image. In the ensuing description, a case where the indication of copyright for the moving image is inserted as the watermark information shall be mentioned as a practicable example. It is permitted to expose illegality such as the piracy of the moving image and to protect the copyright, by inserting the copyright indication into the moving image. A contrivance therefor needs to fulfill the following conditions (a)–(h):

(a) The information of the copyright can be readily embedded in the moving image.

A load on a process for the embedment is not heavy.

(b) In the ordinary looking and listening of the moving image, the quality of the moving image is not damaged.

The information of the copyright embedded within the moving image is not cumbersome in the ordinary looking and listening.

A distortion or the degradation of an image quality is not afforded to the moving image, or at least, it is not noticed by the user.

(c) Even when the moving image has been partially pirated, the information of the copyright remains in the pirated part.

The copyright information is embedded everywhere in the moving image in order that, even in the case of the partial piracy, the possibility of the inclusion of the copyright information in the pirated part may become high.

(d) The copyright information in the moving image can be detected without requiring any special device.

Concretely, when the frame containing the copyright information is viewed as the still image, the copyright information is visually perceivable clearly.

Thus, also the general user (viewer) of the moving image can recognize the existence of the copyright when he/she brings the moving image to a standstill or feeds it in frame units in the display mode of a video recording/reproducing apparatus or a personal computer, or the like.

(e) The copyright information in the moving image is difficult of being removed without the traces of an illicit process. Places where the copyright information exists (as to the frames, and positions in the frames) are made difficult to be easily found, to the extent that the places can be found only by a method in which all the frames are carefully checked.

Thus, the possibility is established that, even when a pirate has removed the watermark information in some of the watermarked frames, the watermark information be left behind in the other watermarked frames.

It is made difficult to erase the traces of the removal of the copyright information, whenever the copyright information has been removed even from only one frame. That is, it is made difficult to present the specific frame as being normal, both as the still image and in relations with the preceding and succeeding frames of the specific frame.

(f) Even after any of the various circulation processes, the copyright information remains in the moving image.

In a case where the moving image is of analog type, it is immune against noise in communication or duplication.

In a case where the moving image is of digital type, it is immune against deterioration ascribable to the compression of the image in a communication process.

(g) A person who holds the copyright, or a person who has inserted the watermark, can definitely state the existence of the copyright information in the moving image.

The definite statement must be found without inspecting all the frames of the actual article of the moving image having been circulated.

The expression "existence" covers the frame positions (frame numbers) in which the copyright information has been inserted, the insertion positions in the frames, the contents of the inserted information, etc.

(h) A person who holds the copyright, or a person who has inserted the watermark, possesses means for readily restoring the original moving image before being watermarked, as may be needed.

This condition is not always indispensable, but it is a desirable requisite.

In order to satisfy the above conditions (a)~(h), the visible-watermark insertion device in this aspect of performance adopts the following expedients (a)~(l):

(a) The information indicative of the copyright is inserted as an image into the suitable frames of the moving image in the form in which the information is visually perceivable clearly in the still image.

The size of the watermark to be inserted is qualitatively such that the watermark is not too conspicuous. On the other hand, the size is such that, when the moving image data are viewed as the still image, the watermark can be visually perceived as pattern information of definite significance even though the use of, for example, a magnifying glass is needed.

Concretely, the size of the watermark is on the order of $\frac{1}{5}$~$\frac{1}{100}$ of the original frame size and is larger than about 10×20 in terms of the number of dots, subject to the condition that the copyright information does not become indefinite due to a too small number of dots. This criterion, however, can fluctuate depending upon the type or sort of the video image, the environment of use of the video image, etc.

(b) The frames into which the copyright information is to be inserted as stated above, are selected so as to be basically isolated from one another.

The isolation is intended to hold the indicating duration of the image of the copyright information very short. Since the number of frames of a moving he image used by an ordinary video recording/reproduction apparatus in one second is 30, the indicating duration of the copyright information based on one isolated frame is $\frac{1}{30}$ second.

Such an indication for the very short duration is not recognized by the viewer of the moving image. By the way, the copyright information is sometimes inserted into a small number of successive frames, e.g., two successive frames in order to prevent the omission of the information attributed to the moving image compression of MPEG2 or the like.

(c) The information to be inserted may be any as long as it can definitely point out the possession of the copyright.

By way of example, the information is the ordinary copyright indication (such as "(C) Fujitsu 1997") or a logotype.

When the frame bearing the inserted watermark is viewed in the static state, the copyright indication needs to be clearly understood. Herein, it is not the essential aim of the present invention to camouflage the copyright information, that is, to insert the information in any of a painted form, an encrypted form, a frequency-converted form, a dot-distributed form, etc.

(d) The information of the copyright indication should preferably have a suitable size as an image.

When the image is too small, the information is degraded by the noise of communication or duplication in the circulation process.

When the image is too large, for example, when it fills up a screen, it becomes conspicuous in, e.g., a slow motion mode and will offend the eye of the viewer. Moreover, it is easily identified by a pirate.

(e) The frames into which the copyright information is to be inserted, are inserted at irregular intervals.

Thus, any person who intends to plagiarize the moving image data cannot readily conjecture the insertion positions.

(f) In the above item (e), for selecting the insertion frames by the use of pseudorandom numbers or the likes, it is recommendable to employ a method which selects the positions at random and which is controlled.

The method has the merits that the insertion of the copyright information is automatically effected, and that the numbers of the insertion frames can be readily reproduced with a small number of items of control information, for example, an algorithm for random number generation and a seed used therefor.

(g) Those positions in the insertion frames at which the copyright information is to be inserted should not be fixed, but they should preferably be selected at random.

This is also intended to make the pirate difficult of knowing the insertion positions.

(h) In the above item (g), for determining the insertion positions by the use of pseudorandom numbers or the likes, it is recommendable to employ a method which determines the positions at random and which is controlled.

The method has the merits of automation and reproducibility.

(i) In inserting the copyright information, the creator of the moving image content records the insertion frame numbers, the insertion frame positions, insertion information, etc., in order that the recorded items may be utilizable in case of legally disputing about a copyright problem in the future.

The fact that a person can point out the places of the information items inserted so as to be usually unnoticed and to be random, without inspecting all the frames of the content, becomes powerful evidence for proving that he/she is the creator, or at least, inserter of the information.

(j) The above records may well be owned in the form of the list of the individual data. Alternatively, in the case of employing the expedient (f) or (h), it suffices to record only the small number of items of control information.

(k) In inserting the copyright information, the creator can record those parts of the original image which are to be hidden by the information.

Using the records of the partial images and those of the above expedient (i) (or the item (j)), the creator can restore the original moving image into which the copyright information has not been inserted yet, as may be needed.

(l) Although the information items of the above expedient (i) (or (j)) (and (k)) can be kept confidential by the creator, they can also be borne in the watermarked moving image after having been encrypted and be circulated by the same storage medium. In this case, only persons who have keys for decrypting the codes can decipher the information items of the expedient (i) and know the insertion positions of the copyright information.

Besides, only the persons who have the keys for decrypting the codes can decipher the information items of the expedients (j) and (k) and restore the original moving image into which the copyright information has not been inserted yet.

In the above, there have been described the conditions which the watermark insertion device of the present invention is to fulfill, and the expedients which implement the conditions. The practicable aspects of performance of the conditions will be described in detail below with reference to the drawings. Incidentally, the ensuing description shall exemplify a case where the original creator who has created and edited the contents of a digital moving image by the use of the moving image processing software of a personal computer asserts the copyright of the data. The creator inserts the information of copyright indication as a visible watermark into the digital moving image in order that the inserted watermark may be immediately detectable even when the digital image has been plagiarized.

Figure 5:
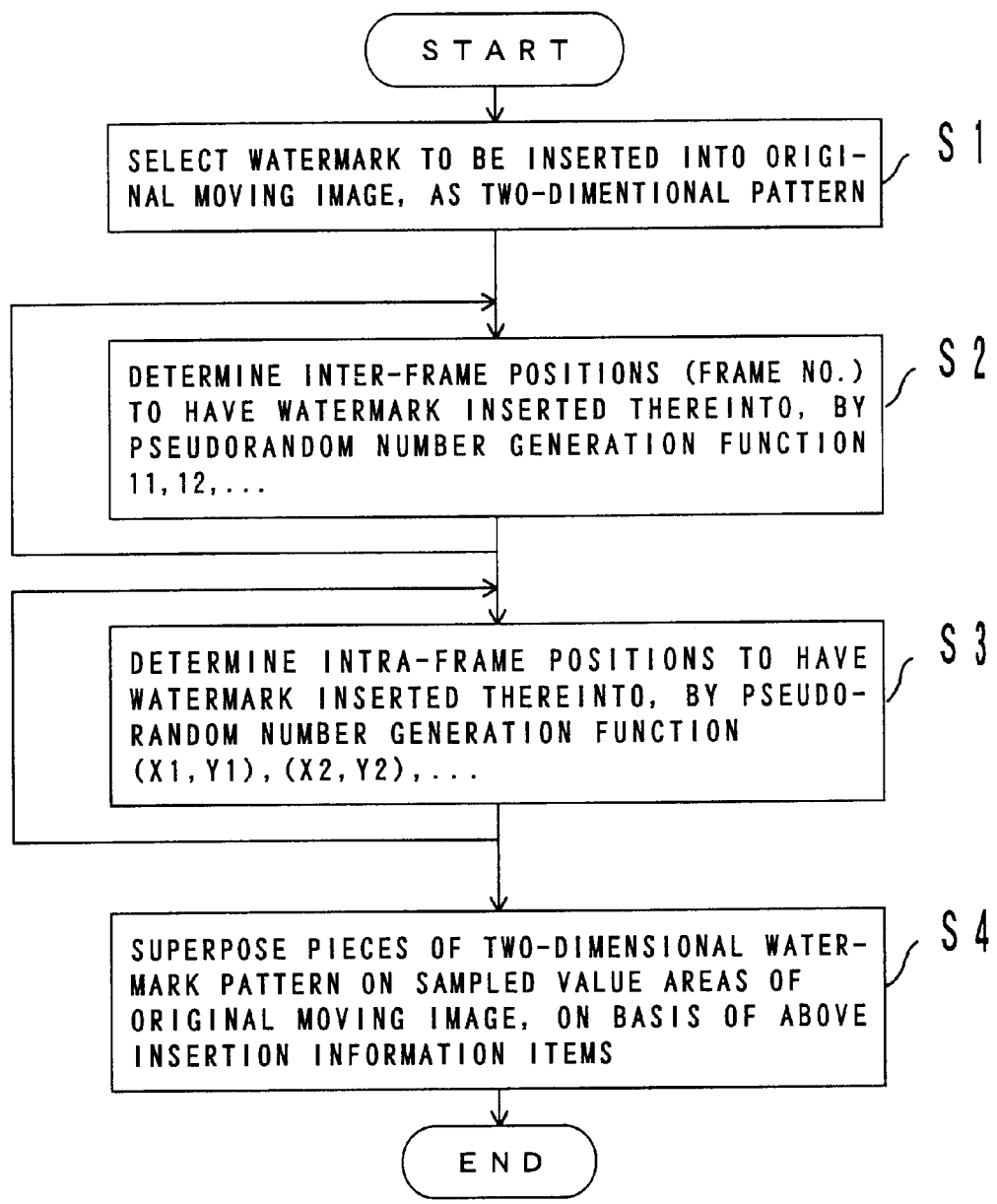
FIG. 5 is a flowchart showing the basic flow of a watermark insertion process.

FIG. 5 is a flowchart showing the basic flow of a watermark insertion process in the present invention. By the way, in flowcharts to be referred to below, a substitution shall be expressed by ":=", and a comparison by "=".

Referring to FIG. 5, when the process has been started, the watermark to be inserted into the original moving image is first selected as a two-dimensional pattern at step S1. At step S2, the inter-frame positions, that is, the frame numbers of frames into which the watermark is to be inserted are determined using a pseudorandom number generation function.

When the frame numbers (I1, I2, ...) of all the frames into which the watermark is to be inserted have been determined at step S2, positions at which the watermark is to be inserted in the respective frames, in other words, the coordinate positions of the left lower points of the pieces of the two-dimensional pattern selected at step S1, are determined using a pseudorandom number generation function at step S3. When the positions ((X1, Y1), (X2, Y2), ...) of the left lower points of the pieces of the two-dimensional pattern in all the frames to have the watermark inserted thereinto have been determined at step S3, the two-dimensional watermark pattern pieces are superposed on the sampled value areas of the original moving image (that is, considering that the image is a set of sample points) on the basis of the information items about the insertion frame numbers and insertion positions at step S4.

Figure 6:
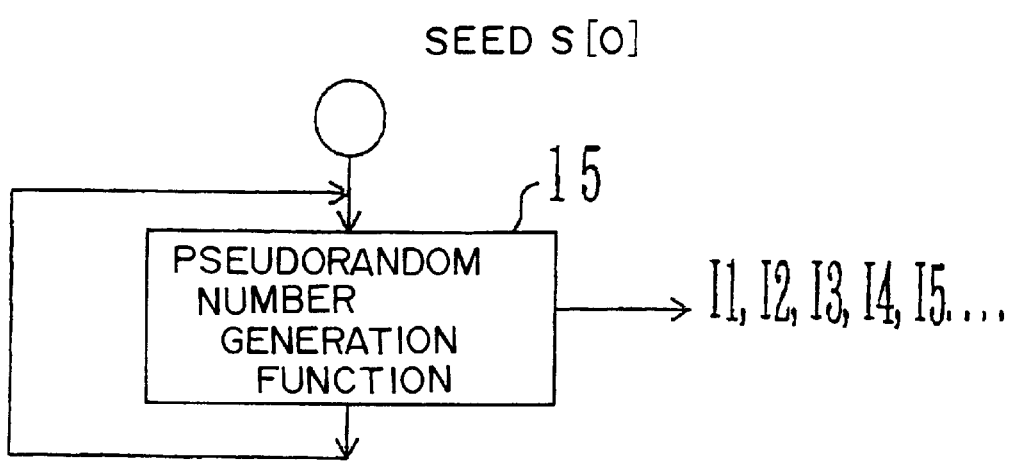
FIG. 6 is a diagram for explaining a method of determining frame numbers.

FIG. 6 is a diagram for explaining a method of determining the frame numbers at step S2 shown in FIG. 5. Referring to FIG. 6, the pseudorandom number generation function 15 outputs the frame numbers of the frames into which the copyright information is to be inserted. In outputting the frame numbers, seeds need to be afforded as will be explained later. In outputting the frame number I1 of the first frame into which the copyright information is to be inserted, the seed S[0] shall be afforded from outside, for example, by the user. Simultaneously with the outputting of the frame number I1, the pseudorandom number generation function 15 outputs the seed S[1], which is used for outputting the next frame number I2. Thenceforth, the seed outputted with the frame number is similarly used for outputting the frame number of the next frame.

Next, the outputting of the frame numbers by the pseudorandom number generation function 15 will be concretely explained. It is assumed by way of example that the moving image continue for about 30 minutes as a whole, and that the number of the frames be N=54,000 frames in total. Although the total number N of the frames may well be unknown, it is assumed here to be known for the sake of brevity. It is also assumed to determine the frame numbers I1, I2, I3, ..., Ik at random so that the copyright information may be inserted at a rate of one frame to the n frames of the moving image on the average, that is, at a rate of one time in n/30 seconds. Here, the value n shall be set at 150 by way of example. Thus, the copyright information is inserted into one frame in 5 seconds.

Alternatively, the rate of the insertion can be contrived so as to be determined by random number values. More specifically, the whole moving image is divided at intervals of a predetermined time period, and the rate of the insertion is changed by the random number values in the respective time intervals. By way of example, the whole moving image is divided at intervals of one minute, and the rate of the insertion is changed using the random number values, in such a manner that "n1" frames are inserted in the first time interval of one minute and that "n2" frames are inserted in the next time interval of one minute.

Incidentally, the maximum value of the "nx" values is set within a range in which any change ascribable to the insertion of the watermark is not visually recognized in the watermarked moving image. On the other hand, the minimum value of the "nx" values is set to the extent that the maximum time period of the image parts in which the watermark is not inserted does not become too long to cope with the piracy of any part of the moving image.

When the rate of the insertion of the watermark is also changed by the random number values in this way, the degree of compliancy of the selection of the insertion positions of the watermark heightens more, and a third party becomes more difficult to predict the insertion positions.

By way of example, a function RANU which generates uniform random numbers (real numbers) within a range of 0~1 including 0 and not including 1 is employed as the pseudorandom number generation function 15, and the random number generating seed S[0] is designated as the seed for determining the first frame number I1. On this occasion, the first frame number is given by the following equation:

$$I1 = \text{floor}(RANU(S[0]) \times n) + 1$$

As stated before, the function RANU outputs simultaneously with the first frame number I1, the seed S[1] which is used for generating the next frame number I2. Here in the above equation, "floor" denotes a function which discards the value of an argument in parentheses, below the decimal point thereof, into an integer.

The kth frame number Ik is generally given by the following equation:

$$Ik = \text{floor}(RANU(S[k-1]) \times n) + 1 + n(k-1)$$

Here, the last term n(k−1)n indicates that the Ikth frame as which one frame is selected every 150th frame belongs to the kth one of sets each consisting of 150 frames, among 54,000 frames in total. The function RANU outputs the seed S[k] serving to output the next frame number, together with the random number for determining the frame number Ik.

Various methods are considered for calculating the random number generating seed S[k]. By way of example, the linear congruential method is used most conveniently.

With this method, a natural number m which is sufficiently large is first selected. Then, the calculation proceeds as follows:

Initial seed $X[0]$ (optionally selected for $0 \leq X[0] \leq m-1$)

Next seed $X[n+1] = a \times X[n] + b \pmod{m}$

Here, the way of selecting constant integers m, a and b is, for example, a standard function in which a=65539 and b=0 are selected by setting m=$2^{31}$ in case of a computer of 32 bits. When the next seed generated with the above values is divided by m, the quotient being turned into the real number, the uniform random number within the range [0, 1) is obtained.

Any of other various methods can be used for calculating the seeds. The methods are built in the random number generation function, and are prepared as mathematical libraries in most programming languages.

Figure 7:
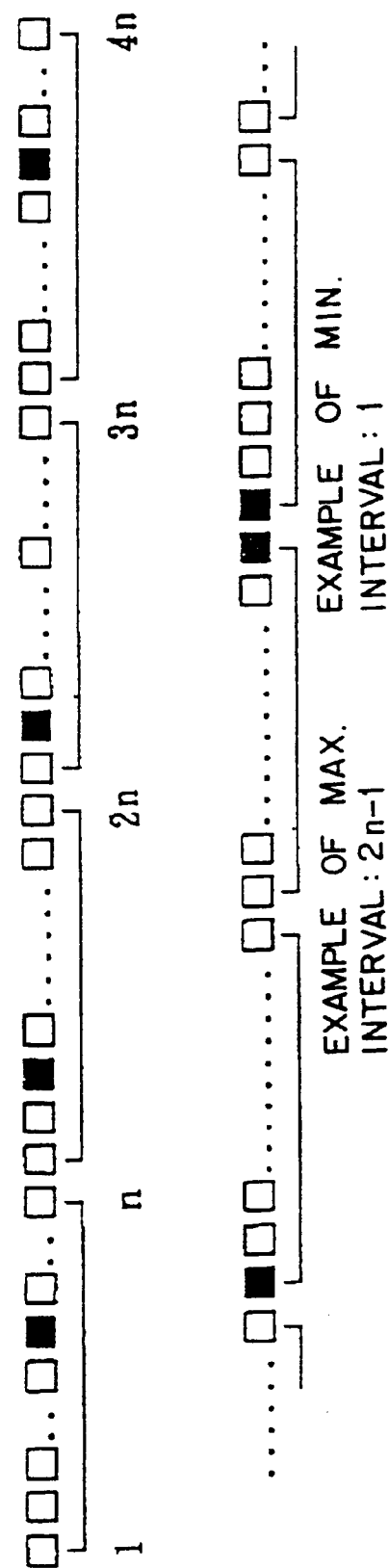
FIG. 7 is a diagram exemplifying the determined results of copyright information insertion frames.

FIG. 7 exemplifies the determined results of copyright information insertion frames obtained in the above way. As explained before, one frame is selected at random from within each frame set consisting of n frames, and the copyright information is inserted into the selected frame. In FIG. 7, squares smeared black denote the frames in which the copyright information is inserted. Within one set of n frames, the frame in which the copyright information is inserted may lie at any position. Therefore, the possible maximum value of the spacing between the frames in which the copyright information is inserted is (2n−1), while the possible minimum value is 1 (one). The average value of the spacings is n, and the maximum value thereof is guaranteed to be, at most, 2n.

Besides, unlike the above case where the rate of the insertion of the copyright information is uniformalized in the moving image, it can be contrived so as to differ in the moving image. By way of example, in the case of selecting the insertion frame from within each set consisting of n frames as stated above, the value n may be changed as random number values. Alternatively, the moving image may be sectioned at intervals of a predetermined number of frames, and the number of the insertion frames in each section may be changed.

Figure 8:
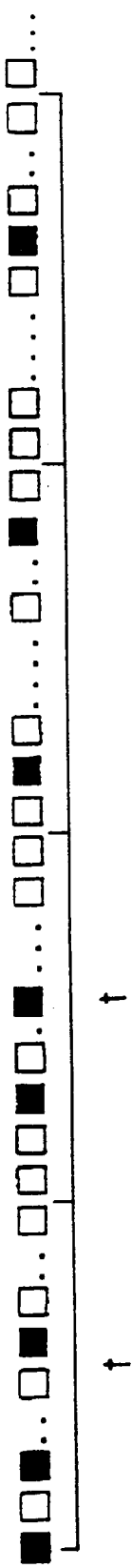
FIG. 8 is a diagram showing the determined results of copyright information insertion frames in the case where the rate of insertion has been changed.

FIG. 8 exemplifies the determined results of the insertion frames of the copyright information in the case where the rate of the insertion has been changed by the random number values. In FIG. 8, as in FIG. 7, squares smeared black denote the frames in which the copyright information is inserted. In the example of FIG. 8, the number of the frames in which the copyright information is inserted, within each predetermined section t, changes to be 3, 2, 2, 1, from the head at the rates determined by the random number values.

When the frame numbers of the frames into which the copyright information is to be inserted have been determined, the positions at which the copyright information is to be inserted in the frames having the determined numbers, in other words, the coordinates of the lower left points of the pieces of the two-dimensional pattern are subsequently determined using the pseudorandom numbers.

Figure 9:
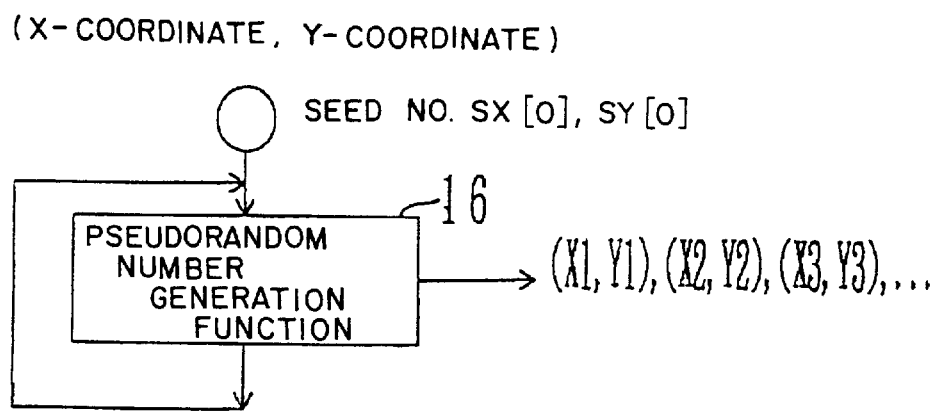
FIG. 9 is a diagram for explaining a method of determining the insertion positions of copyright information.

FIG. 9 is a diagram for explaining a method of determining the insertion positions of the copyright information. Referring to the figure, a pseudorandom number generation function 16 is a function which is similar to the pseudorandom number generation function 15 shown in FIG. 6, and which outputs the intra-frame X-coordinate values and Y-coordinate values of the lower left points of the pieces of the two-dimensional pattern. As in the case of FIG. 6, in outputting the X-coordinate value X1 within the first frame, a seed SX[0] is required for generating a random number. Besides, a seed SY[0] is required for outputting the Y-coordinate value Y1. These seeds shall be afforded from outside.

As in the case of FIG. 6, in outputting the coordinates X2 and Y2 of the lower left point of the two-dimensional pattern within the next frame, there are used seeds SX[1] and SY[1] which the pseudorandom number generation function 16 outputs simultaneously with the outputting of the random numbers used for the determination of the coordinates X1 and Y1. Thenceforth, the X- and Y-coordinates of the lower left point of the two-dimensional pattern and seeds for calculating the coordinates in the next frame are similarly outputted.

Figure 10:
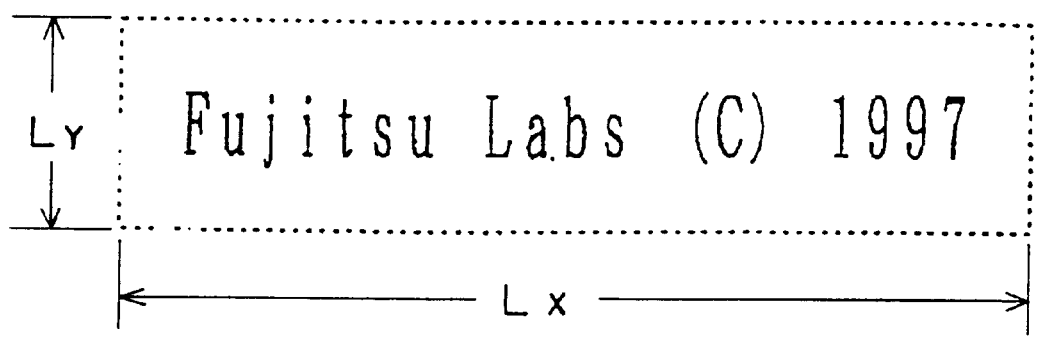
FIG. 10 is a diagram showing a practicable example of the copyright information.

FIG. 10 shows a practicable example of the copyright information. Regarding the copyright information to be inserted, an area enclosed with a dotted line in FIG. 10 is handled as the two-dimensional pattern, which has a size of Lx dots (in width)×Ly dots (in height), for example, 300 dots×60 dots. The color and tonal density of letters constituting the pattern are assumed fixed for the brevity of description.

Figure 11:
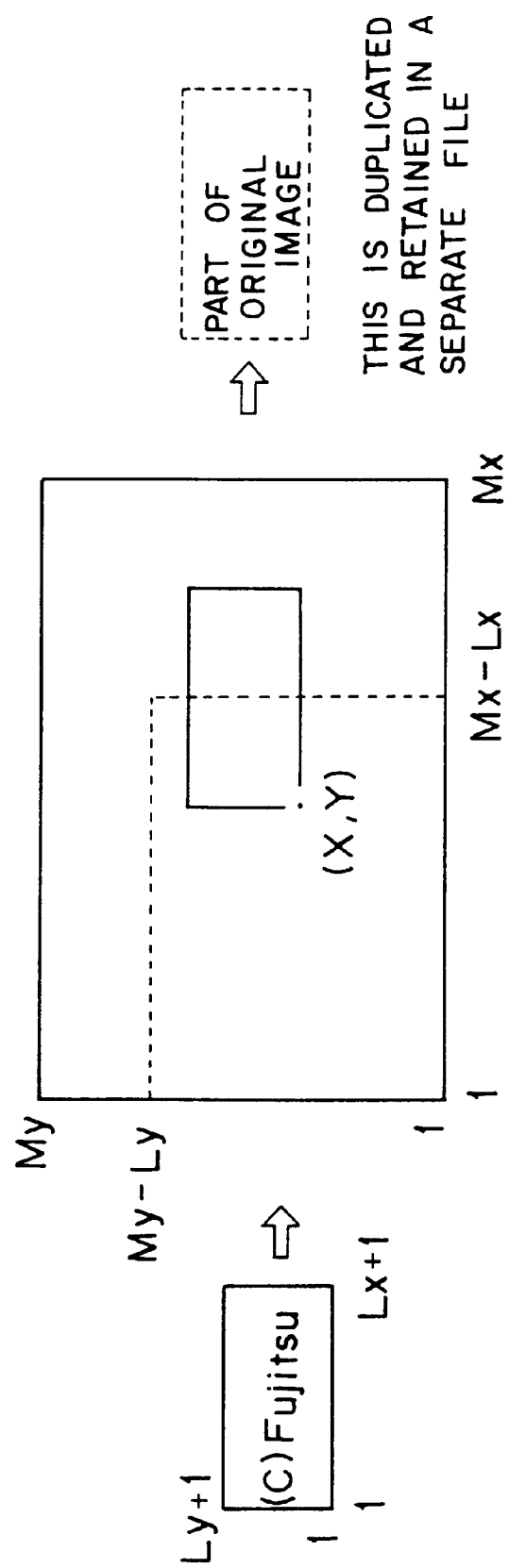
FIG. 11 is a diagram for explaining the insertion of the copyright information into one frame.

FIG. 11 is a diagram for explaining the insertion of the copyright information into one frame. In the figure, it is assumed that one frame have a size of Mx dots (in width) My dots (in height), and that the position of any dot be expressed by X- and Y-coordinates with reference to the lower left point of the frame.

As explained in conjunction with FIG. 10, the two-dimensional pattern as the copyright information to be inserted has the size of Lx dots (in width) Ly dots (in height). In order to set the left lower point as the insertion position of the two-dimensional pattern, the range of the insertion position in one frame is limited within an oblong the two sides of which are indicated by a dotted line in FIG. 11. That is, the range extends from 1 to (Mx−Lx) in terms of X-coordinate values and from 1 to (My−Ly) in terms of Y-coordinate values.

The pseudorandom number generation function 16 shown in FIG. 9 outputs the coordinates X1 and Y1 of the left lower point of the two-dimensional pattern by the following equations, in correspondence with the respective values SX[0] and SY[0] afforded as the random number generating seeds to the first frame as explained before:

$$X1=\text{floor}(\text{RANU}(SX[0])\times(Mx-Lx))+1$$

$$Y1=\text{floor}(\text{RANU}(SY[0])\times(My-Ly))+1$$

Here, regarding the functions RANU, the same function as in the foregoing case of outputting the frame numbers is used. Simultaneously with the outputting of the coordinates X1 and Y1, the pseudorandom number generation function 16 outputs the random number generating seeds SX[1] and SY[1] for outputting the insertion position of the two-dimensional pattern in the next frame.

The coordinates Xk and Yk of the position at which the two-dimensional pattern is to be inserted, in the kth frame into which the copyright indication is to be inserted, that is, in the frame of frame number Ik, are given by equations below. The random number generating seeds SX[k] and SY[k] which are used for outputting the insertion position of the two-dimensional pattern in the next frame are outputted from the pseudorandom number generation function 16, together with the random numbers for computing the positional coordinates.

$$Xk=\text{floor}(\text{RANU}(SX[k-1])\times(Mx-Lx))+1$$

$$Yk=\text{floor}(\text{RANU}(SY[k-1])\times(My-Ly))+1$$

Figure 12:
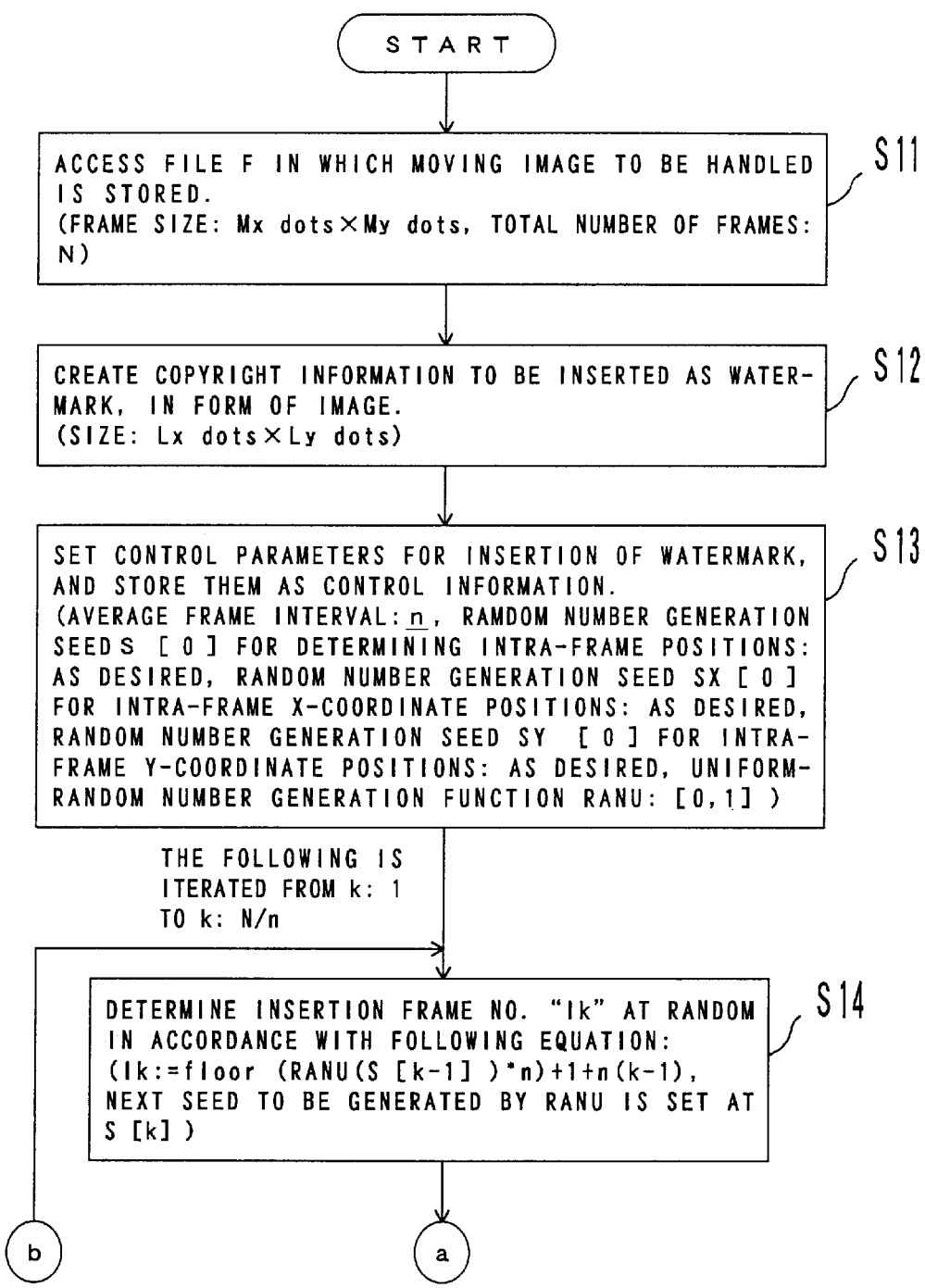
FIGS. 12 and 13 are flowcharts showing the detailed flow of the visible-watermark insertion process.
Figure 13:
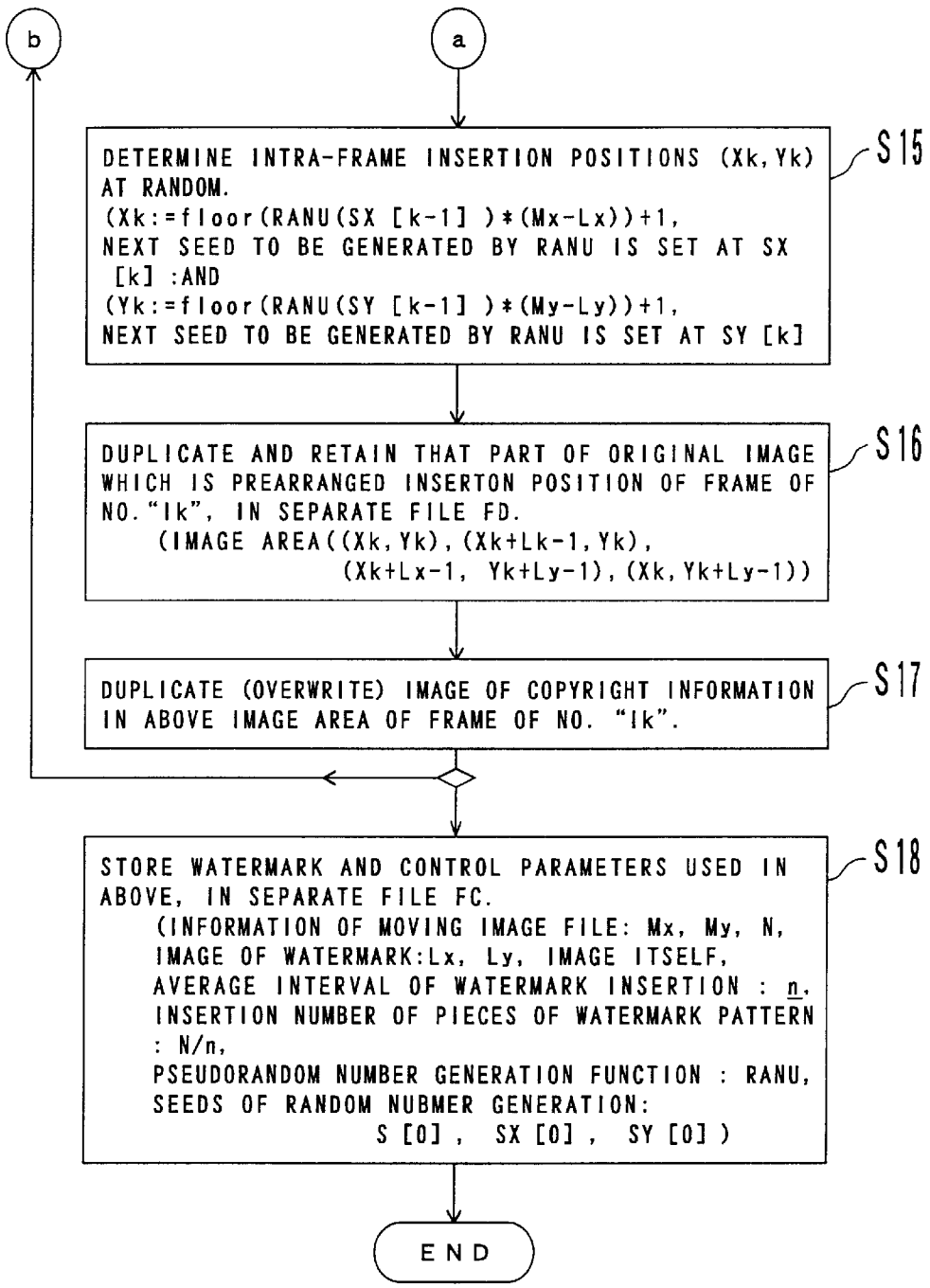

FIGS. 12 and 13 are flowcharts showing the detailed flow of the visible-watermark insertion process, with the above description summed up. Referring to FIG. 12, when the process has been started, a file F in which a moving image to be handled, namely, an original moving image not bearing an inserted watermark is stored is first accessed at step S11. It is assumed that the frame size of the image be Mx dots×My dots, and that the total number of frames be N.

At next step S12, copyright information to be inserted as the watermark is created as an image, namely, a two-dimensional pattern. The size of the pattern is assumed to be Lx dots×Ly dots. Subsequently, at step S13, control parameters for the watermark insertion are set and are stored as control information. Set as the control parameters are the average interval n of the frames into which the copyright information is to be inserted, a random number generating seed S[0] for determining the number of the first frame, random number generating seeds SX[0] and SY[0] for determining X- and Y-coordinate values in the first frame, and a function RANU for generating uniform random numbers in a range of from 0 to 1.

After the control parameters have been set at step S13, the determinations of the number of the frame into which the copyright information is to be inserted and that position in the frame at which the copyright information is to be inserted, the insertion of the copyright information, etc. are iterated at steps S14~S17. At step S14, the number of the frame into which the copyright information is to be inserted is determined as explained before. Step S15 shown in FIG. 13 determines the insertion position of the two-dimensional pattern as the copyright information within the determined frame, namely, the coordinates of the left lower point of the pattern within the frame. Subsequently, at step S16, that part of the original image into which the two-dimensional pattern as the copyright information is to be inserted, namely, the part which is designated by four vertices is duplicated and has its content retained in a separate file FD in order that the original image before the insertion of the copyright information may be restored at need. Thereafter, at step S17, the image of the copyright information is duplicated or overwritten in the designated area.

After the process of steps S14~S17 has been iterated N/n times (k:=1~N/n), the watermark information and the control parameters thereof are stored in a separate file FC at step S18. Then, the watermark insertion process is ended. Here, contents to be stored as the control parameters are Mx and My indicative of the size of each frame and N indicative of the total number of frames as are the information items of the moving image file F; Lx and Ly indicative of the size of the image of the watermark and the data of the image itself; the average frame interval or spacing n of the watermark insertion; the number N/n of the insertion frames; the pseudorandom number generation function RANU; the seeds S[0], SX[0] and SY[0] for generating the random numbers; and the calculating algorithm for the frame number Ik and insertion position (Xk, Yk) as stated before.

After having inserted the copyright indication in the above way, the creator of the moving image can create records in the form of a list as one method in order to record the insertion positions of the copyright indication within the image. More specifically, the list can be created with each set consisting of the frame number Ik and the insertion position (Xk, Yk), for all the values k:=1, 2, . . . , and N/n. As a more compact recording method, the control information items which are the control parameters mentioned at step S18 in FIG. 13 can be recorded and retained.

FIG. 14 is a diagram for explaining an example in which such control information items are encrypted and borne in the moving image file. Referring to the figure, besides frames of watermarked moving image in all, the watermark control information items which are the control information items mentioned at step S18 in FIG. 13 and all of which have been encrypted are stored in the control table of the file. In a case where the watermark control information items are stored in the control table of the file in this manner, and where they are duplicated in, for example, a floppy disk together with the watermarked moving image, the control information items can also be offered directly to the user side. Since, in this case, the watermark control information items have been encrypted, a user having a key for decryption can know the contents of the watermark control information items by utilizing the key, whereby he/she can know the insertion positions of the copyright information. On this occasion, when the partial images of the original image before the insertion of the copyright information as duplicated in the separate file FD at step S16 are offered to the user side in the encrypted states, a user having a key for decryption can also restore the original moving image in which the copyright information as the watermark has not been inserted yet, by utilizing the key.

Figure 15:
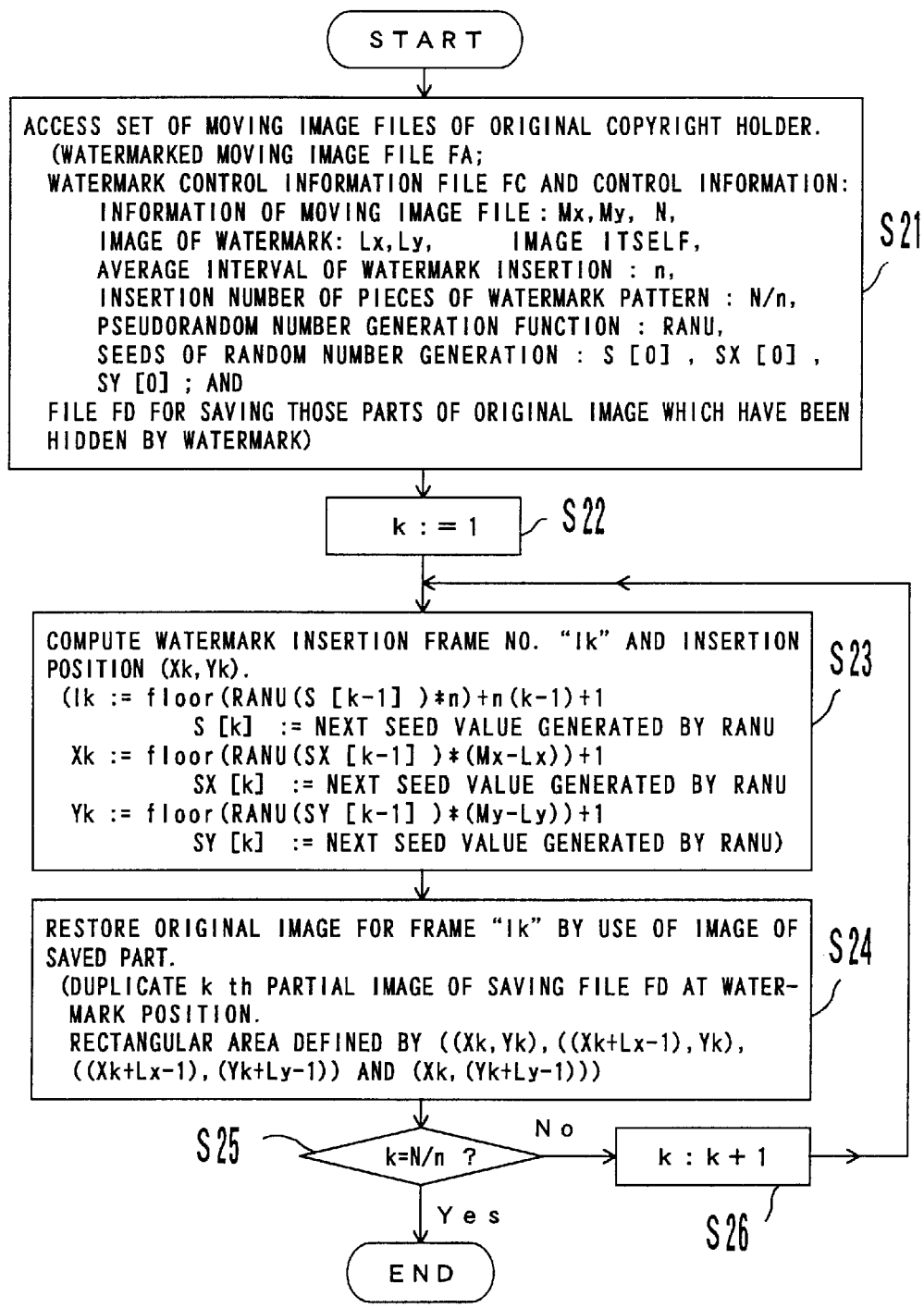
FIG. 15 is a flowchart showing a process for restoring a watermarked moving image into an original image which is not watermarked.

FIG. 15 is a flowchart showing a process for restoring the watermarked moving image into the original image which is not watermarked, in this manner. Referring to the figure, when the process has been started, the set of the moving image files of the original copyright holder are accessed at step S21. The set of the files includes the contents of a watermarked moving-image file FA, the file FC storing the watermark control information therein, as well as the control information which is as mentioned at step S18 in FIG. 13, and the file FD in which the parts of the original image hidden by the watermark are saved.

Subsequently, the value of the variable k indicative of the number of the watermarked frame among the group of frames in which the watermark or copyright information is inserted is initialized to 1 (one) at step S22. Thereafter, processing at steps S23~S26 is iterated. At step S23, the frame number Ik and the insertion position (Xk, Yk) of the copyright information are first computed in the same manner as in the processing at step S14 in FIG. 12 and step S15 in FIG. 13. At the next step S24, the original image in which the copyright information is not inserted is restored for the frame Ik by the use of the saved partial image. In this processing, the partial image retained in the saving file FD is duplicated at the watermark insertion position which is determined by four vertices.

Subsequently, whether or not the value of the variable k has reached N/n is decided at step S25. On condition that the number of times N/n has not been reached yet, the value of the variable k is incremented one (+1) at step S26, whereupon the processing at step S23 et seq. is iterated. Upon the decision of step S25 that the variable k has reached the number of times N/n, the original-image restoration process is ended.

As described above, according to the present invention, the watermark information or copyright information which is visually perceivable clearly in the static or still image is inserted into the frames of the moving image at irregular intervals. However, in the case where the copyright information is viewed in the moving image, it cannot be visually recognized because the indicating duration thereof in one frame is sufficiently short. The information which is inserted in this way, shall be termed the "visible watermark" in the present invention as stated before. Such an effect has already been extensively known, and has been psychologically researched in. The present invention utilizes such an effect positively for copyright protection.

Incidentally, as is known, notwithstanding that the information inserted in the form as described above is not visually recognized definitely, it is subliminally memorized by the viewer. Therefore, the applications of the effect to advertising etc. are thought outrages against human rights and are legally regulated. This point needs to be taken into consideration even in a case where the visible watermark is utilized only for the copyright indication in the present invention.

Figure 16:
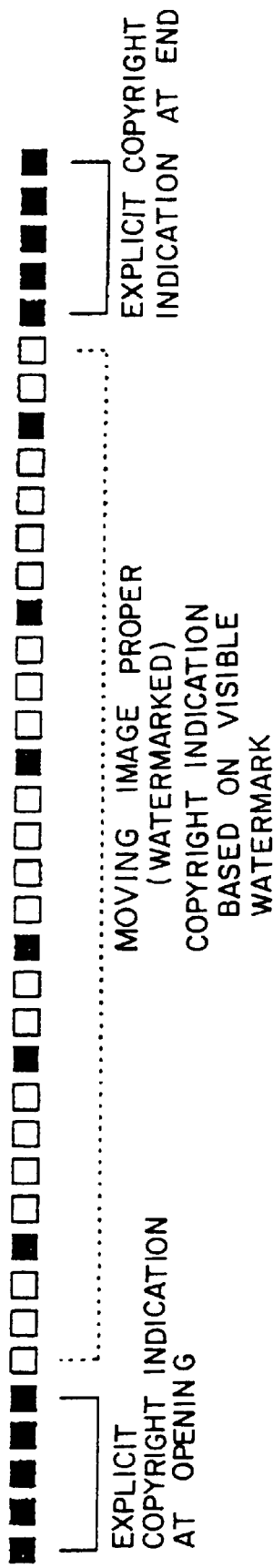
FIG. 16 is a diagram for explaining a copyright indication method which serves to exclude the influence of a subliminal effect.

FIG. 16 is a diagram for explaining a copyright indication method which serves to exclude the influence of the subliminal effect. Referring to the figure, the information of copyright indication being a visible watermark is inserted in a frame image being the body of a moving image, at irregular intervals (as denoted by black squares). Moreover, the copyright information is indicated at the opening and end of the moving image, for example, a cinema for time periods of, for example, several seconds so as to be definitely seen by a viewer. Thus, the copyright information which is memorized on the basis of the subliminal effect becomes the same as the one which is definitely indicated at the opening and end, so that any bad influence on the viewer is avoidable.

While the whole aspect of performance of the present invention has been detailed in the above, the present invention is not restricted to the foregoing aspect of performance, but it can be carried out in various different aspects of performance. In the foregoing aspect, one sort of information as shown in FIG. 10 has been mentioned as the copyright indication. It is also possible, however, that a plurality of sorts of copyright indication information be prepared, for example, in English and Japanese, and that at least two of the plurality of sorts of information be selected in accordance with designations based on pseudorandom numbers and be inserted into the frame image of a moving image data, in the same way as in the operation of selecting the numbers of the frames to have the copyright information inserted.

Figure 17:
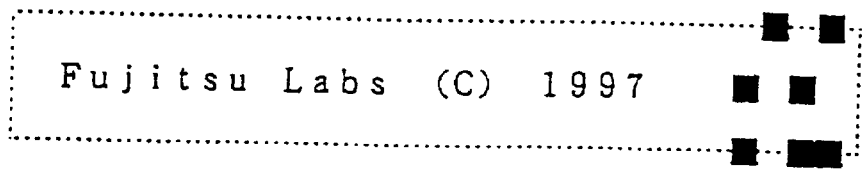
FIG. 17 is a diagram showing an example in which a different pattern is inserted as part of copyright indication.
Figure 18:
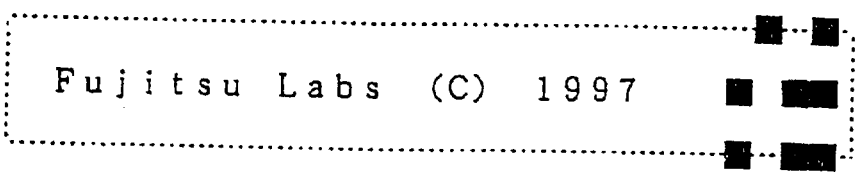
FIG. 18 is a diagram showing an example in which a pattern obtained by encrypting frame number is inserted as part of copyright indication.

Moreover, the information of the copyright indication is not restricted only to the letters as shown in FIG. 10, but it can contain a pattern. Such examples are illustrated in FIGS. 17 and 18. FIG. 17 illustrates the example in the case where any of different patterns (which differ depending upon the number and positions of black squares) is inserted as part of the copyright indication information in accordance with designations based on pseudorandom numbers, in the same way as in the case of selecting the two or more sorts of copyright indication information. The degree of complicacy of the copyright indication can be heightened by inserting the different patterns in this manner.

Likewise to the example of FIG. 17, the example of FIG. 18 is such that any of different patterns is inserted as part of the copyright indication information. By way of example, the different patterns to be inserted are obtained in such a way that the frame numbers of frames to bear the copyright indication information are encrypted using a hash function or the like. Thus, the copyright indication information itself is encrypted, and the degree of complicacy of the indication is heightened still more. In addition, when a technique which allows decrypting the frame numbers from such patterns conversely is employed for the above encryption, it will be effective in cases of detecting the copyright indication information and restoring an original moving image.

Regarding the frames into which the information of the copyright indication is to be inserted, it has been described in conjunction with FIG. 7 that only one frame is randomly selected from within each group consisting of n frames. However, such presentation in only one frame is not restrictive, but the copyright information can also be presented in a small number of successive frames, e.g., two or three successive frames. The numbers of the successive frames can be selected by designations based on pseudo-random numbers, in the same way as in the foregoing. Owing to such presentation in the plurality of successive frames, in case of employing the moving-image compression scheme of MPEG or the like, the copyright indication is regarded as noise, and an interpolation from the preceding and succeeding frames is done. Accordingly, a phenomenon in which the copyright indication becomes obscure can be mitigated to the utmost.

It has been described in conjunction with FIG. 10 that the color and tonal density of the information of the copyright indication are fixed. It is also possible, however, to insert copyright indication information of which the tonal density, color, etc. are adjusted. More specifically, after the color and tonal density of an image surrounding the insertion position of the copyright indication information have been decided, the tonal density, color, etc. of the copyright indication information may be adjusted in accordance with the decided results so as not to become excessively conspicuous or so as to become appropriately conspicuous.

According to the method described above, the copyright indication can be inserted into the moving image as the visible watermark. The insertion process is simple, and can also be easily automated using digital-moving-image editing tools built in a personal computer.

It is very easy to detect and confirm the copyright indication which is contained in the moving image created by the above method. More specifically, using an ordinary moving-image viewing apparatus, the frame image of the moving image may be displayed in the frame feed mode (or slow motion mode of very low speed) of the apparatus so as to visually perceive the copyright indication. Such confirming operations are possible in many of moving-image viewing apparatuses being in wide use among consumers, and can be executed even by the general viewers who do not expert on image processing. Incidentally, an expert, for example, can utilize the above-stated control information in order to raise the efficiency of the verification of the copyright indication. More specifically, the expert may find the numbers of the frames bearing the inserted copyright indication, and the insertion positions of the indication in the frames, on the basis of the contents of the control information, thereby to display and confirm the insertion frames in succession.

Now, there will be described the detection and decision of the piracy of the moving image in which the copyright information has been inserted in the above way. Incidentally, the ensuing description will mention a case where a moving image, for example, a cinema in which the copyright information of a legal copyright holder "A" is inserted as a visible watermark is pirated only partially, not as a whole.

In a case where a dealer "B" having no copyright is suspected to have illegally pirated part of the moving image for the purpose of commercial use, the copyright holder "A" can expose the illegality in any of situations stated below.

The simplest is a case where, when a common viewer "C" having bought the moving image as a commodity (or an article of commerce) from the dealer B has brought the moving image to a standstill midway, the moving image has happened to stop at a frame bearing the copyright indication of the copyright holder A, and the viewer C has noticed the copyright indication of the holder A, unlike that of the dealer B, in the specific frame. When the viewer C inquires of the dealer B or communicates to the copyright holder A, the illegal action of the dealer B is revealed.

In case of a similar moving image which might have been pirated, the copyright holder A can prove the traces of the piracy by analyzing the moving image which is the commodity of the dealer B. Proving aspects are as stated below.

(b1) A frame in which the copyright indication of the copyright holder A remains, has been extracted from within the moving image of the commodity of the dealer B. If the moving image is the lawful commodity of the dealer B, it ought not to bear the copyright indication of the holder A.

(b2) A frame in which the copyright holder A has inserted the copyright indication is lacking in the moving image of the commodity of the dealer B, and movements before and behind the specific part are unnatural. A temporal skip or omission corresponding to one frame can be proved from the movements in frames preceding and succeeding the specific frame.

(b3) In the moving image of the commodity of the dealer B, the position (or positions) of the copyright indication of the dealer B agrees with (or include) the first position at which the copyright holder A has inserted the copyright indication. In this case, it is conjectured that the dealer B will have overwritten the first position with the intention of erasing the copyright indication of the copyright holder A. It must be attended to that, for the purpose of camouflage, the dealer B sometimes puts their copyright indication in frames more than those in which the copyright holder A has inserted his/her copyright indication.

(b4) In the moving image of the commodity of the dealer B, the first frame in which the copyright holder A has put his/her copyright indication or that part of the first frame which corresponds to the copyright indication is conjectured to have been created by such a process as an interpolation from the preceding and succeeding frames, and it is somewhat uneasy.

Figure 19:
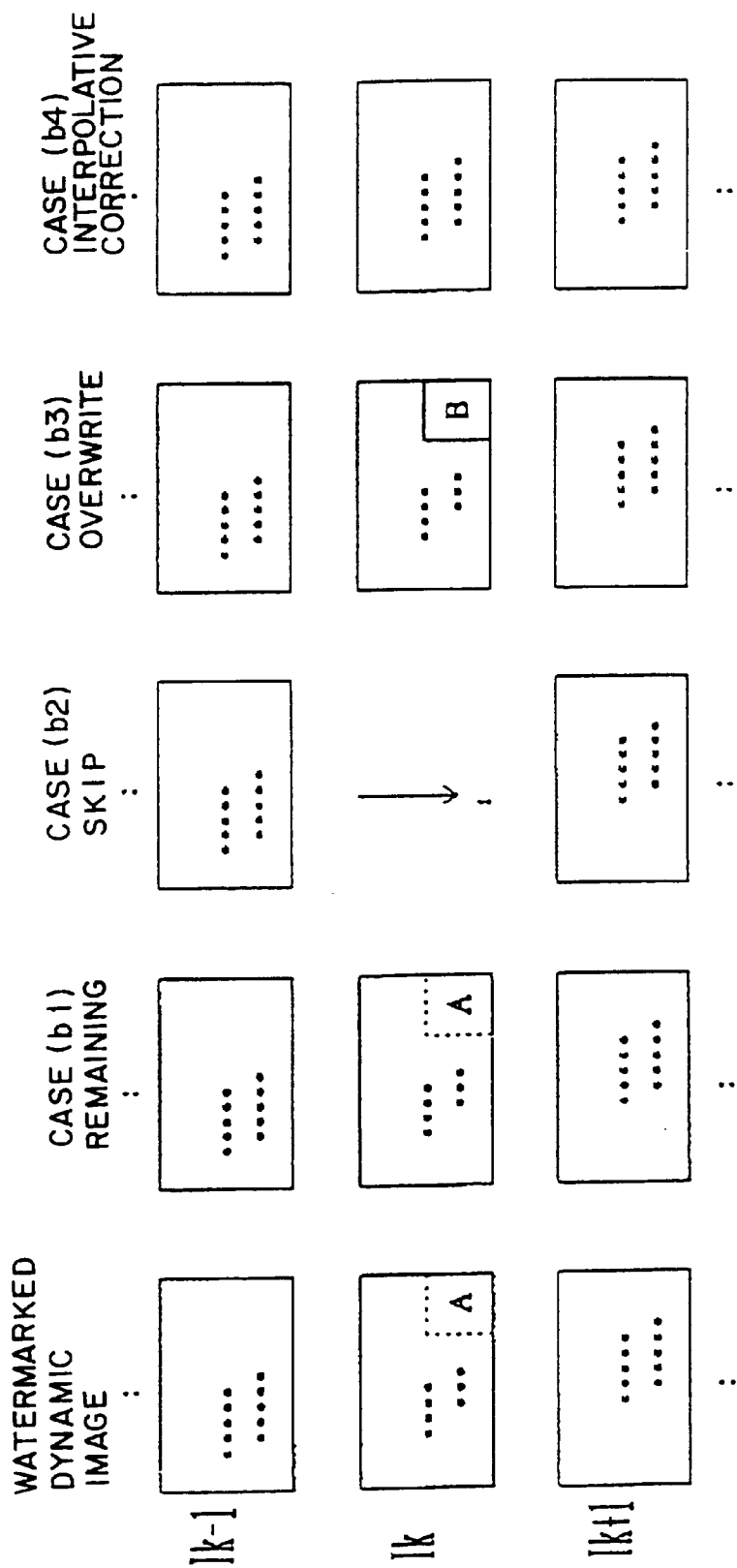
FIG. 19 is a diagram for explaining camouflagic examples in the case of the piracy of a moving image.

FIG. 19 is a diagram for explaining camouflagic examples on the occasion of the piracy of the image by the dealer B. The leftmost part of the figure illustrates the watermarked moving image, in which the copyright indication of the copyright holder A is inserted at the right lower corner of a frame of frame number "Ik". A case (b1) corresponds to a situation where the copyright indication of the copyright holder A remains in the moving image of the commodity of the dealer B.

In a case (b2), the frame Ik in which the copyright indication of the copyright holder A is inserted is skipped.

In a case (b3), the part of the copyright indication of the copyright holder A is overwritten by the copyright indication of the dealer B, and the copyright indication of the copyright holder A is erased.

In a case (b4), the image of the frame number Ik is created by an interpolation from the preceding frame of frame number "Ik−1" and the succeeding frame of frame number "Ik+1".

In the cases (b1) and (b2) among the four cases, it is objectively persuasive that the copyright holder A directly asserts the piracy by the dealer B. In the cases (b3) and (b4), however, the conclusion of the piracy is delicate, and a judgement by an expert who is a public third party will be necessary.

The copyright holder A can request the expert of the public third party, for example, the Authentication Office, to give an expert opinion on the piracy. Expedients for the judgement are basically the same as in the cases (b1)~(b4). The expert of the Authentication Office views the images themselves to decide if the watermarked original moving image of the copyright holder A and the moving image of the commodity of the dealer B have an identical source. Upon deciding the identical source, the expert judges which of the images is piratic. In filing a petition with the Authentication Office, the copyright holder A submits the control information of the insertion of the watermark as mentioned at step S18 in FIG. 13. Also, the dealer B can submit similar control information (if any) as a counteraction. As a result, the following cases can take place:

(c1) The copyright indication of the copyright holder A has been found in the moving image of the commodity of the dealer B. Then, the plagiary of the A's moving image by the dealer B is proved.

(c2) The moving image of the commodity of the dealer B includes the part of which the preceding and succeeding frames contain unnatural movements, and which is decided to have come from the removal of one frame. Moreover, the part corresponds to a frame in which the copyright holder A has inserted his/her copyright indication. Then, the plagiary of the A's moving image by the dealer B is proved.

(c3) The places of the copyright indication inserted by the dealer B are arranged so as to cover up the A's copyright indication without fail. If the places of both the A's and B's copyright indications match completely, which of the moving images is the source cannot be immediately concluded without further data. In general, the moving image in which the indication is presented in a small number of places has a higher possibility of being the source.

In this case, the decision becomes quite definite when the copyright holder A is let submit the control information of the watermark insertion. The copyright holder A reports the use of the pseudorandom numbers in the presentation of the copyright indication, and demonstrates the value of the seed of the used random numbers, as well as the algorithm for the generation of the random numbers. Thus, the copyright holder A can automatically reproduce all the insertion positions of his/her copyright indication. In contrast, the dealer B is unable to submit such systematic materials. At most, the dealer B can merely demonstrate concrete values at the piratic parts, in the form of a list. This is because no method other than trial and error can be used in order that the seed value employed for the generation of the uniform random numbers may be conjectured from the output results of the random numbers.

(c4) In a case where the dealer B has produced as their commodity the moving image in which the part of the copyright indication of the copyright holder A has altered by a method such as the interpolation from the preceding and succeeding frames, the decision becomes more delicate, and the naturalness of the image is first disputed about in the same way as in the case (b4).

In this case, for arranging the dealer B most powerfully, the copyright holder A will need to submit to the Authentication Office the control information of the watermark insertion and the original moving image before the watermark insertion. Then, it can be proved that the portion of the moving image posing the problem of the piracy by the dealer B is part of the moving image of wider range lawfully owned by the copyright holder A. More specifically, the parties A and B own the portions of the moving images decided to come from an identical source, and the portion owned by the party A is larger than by the party B. Herein, if the legality of the copyright of the holder A has already been established, the assertion of the dealer B owning only the partial image weakens. By the way, it is also considered in this case that, after the moving images of the parties A and B coming from the common source were separately distributed, the party A has inserted the copyright indication, while the party B has also gained the lawful copyright of the moving image in any form and has put the moving image into the article of commerce.

As thus far explained, the decision of the piracy is quite definite in any of the cases (a), (b1), (b2), (c1), (c2) and (c3), and the piracy by the dealer B is socially clarified with ease. The most delicate case is the case (c4). However, it requires enormous labor that the dealer B alters the moving image created by the copyright holder A, to the extent of withstanding such an expert opinion. More specifically, the dealer B needs to execute such a high degree of moving image processing that the portion of the A's moving image to be pirated is fed every frame so as to find out all the pieces of the A's copyright indication, that each part of the copyright indication is restored by the method such as the interpolation from the preceding and succeeding frames, and that the image is corrected so as to eliminate discontinuities at the boundary of presentation, etc. Moreover, even when such operations have been performed, the identity of the source of the moving images can be clearly decided, and hence, the dealer B needs must prove the means of acquisition of their moving image. In a case where, at the time of the creation of the moving image and the insertion of the visible watermark, the copyright holder A registered the watermarked moving image and the confidential or encrypted control information of the watermark insertion with a public third party, for example, the National Diet Library, any public library or the Authentication Office, he/she can take a very strong objective stand in the dispute about the rights. On this occasion, the key of the encryption is registered in a sealed state.

In this manner, the labor and camouflage which the dealer B requires for the piracy of the moving image will not counterbalance their profits. In this sense, the visible watermark according to the present invention facilitates the exposure of the piracy of the moving image and can therefore prevent the piracy from occurring.

Methods for asserting and verifying the legality of the copyright against the piracy of the moving image as explained above, will be described more with reference to the drawings.

Figure 20:
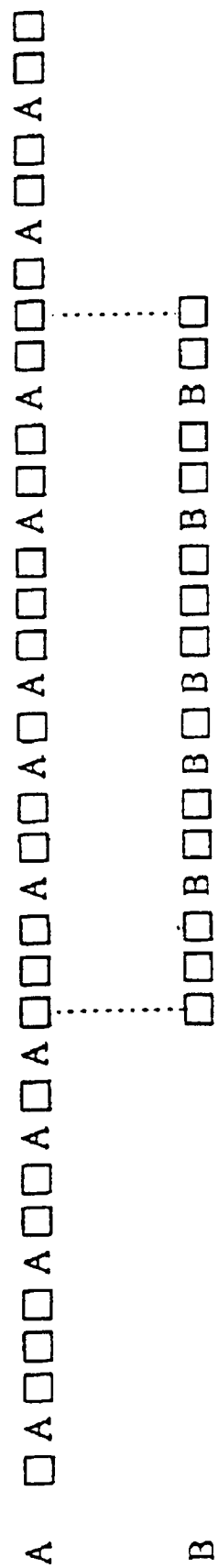
FIG. 20 is a diagram for explaining a method of disputing with an unlawful dealer who has pirated a moving image, about the legality of copyright.

FIG. 20 is a diagram for explaining an example in which the copyright holder A disputes with the unlawful pirate dealer B about the legality of the copyright of the moving image. In this example, the dealer B has pirated only part of the moving image of the lawful copyright holder A, and the copyright indication of the copyright holder A included in the corresponding part has been overwritten by the copyright indication of the dealer B, thereby to be erased. In this case, the copyright holder A can reveal the numbers of the frames bearing the inserted watermark and the control parameters denoting the insertion positions, throughout the moving image. In contrast, the pirate dealer B can merely cite watermark insertion positions within only the part at issue. Accordingly, it can be clearly proved that the legality of the copyright consists in the copyright holder A.

Figure 21:
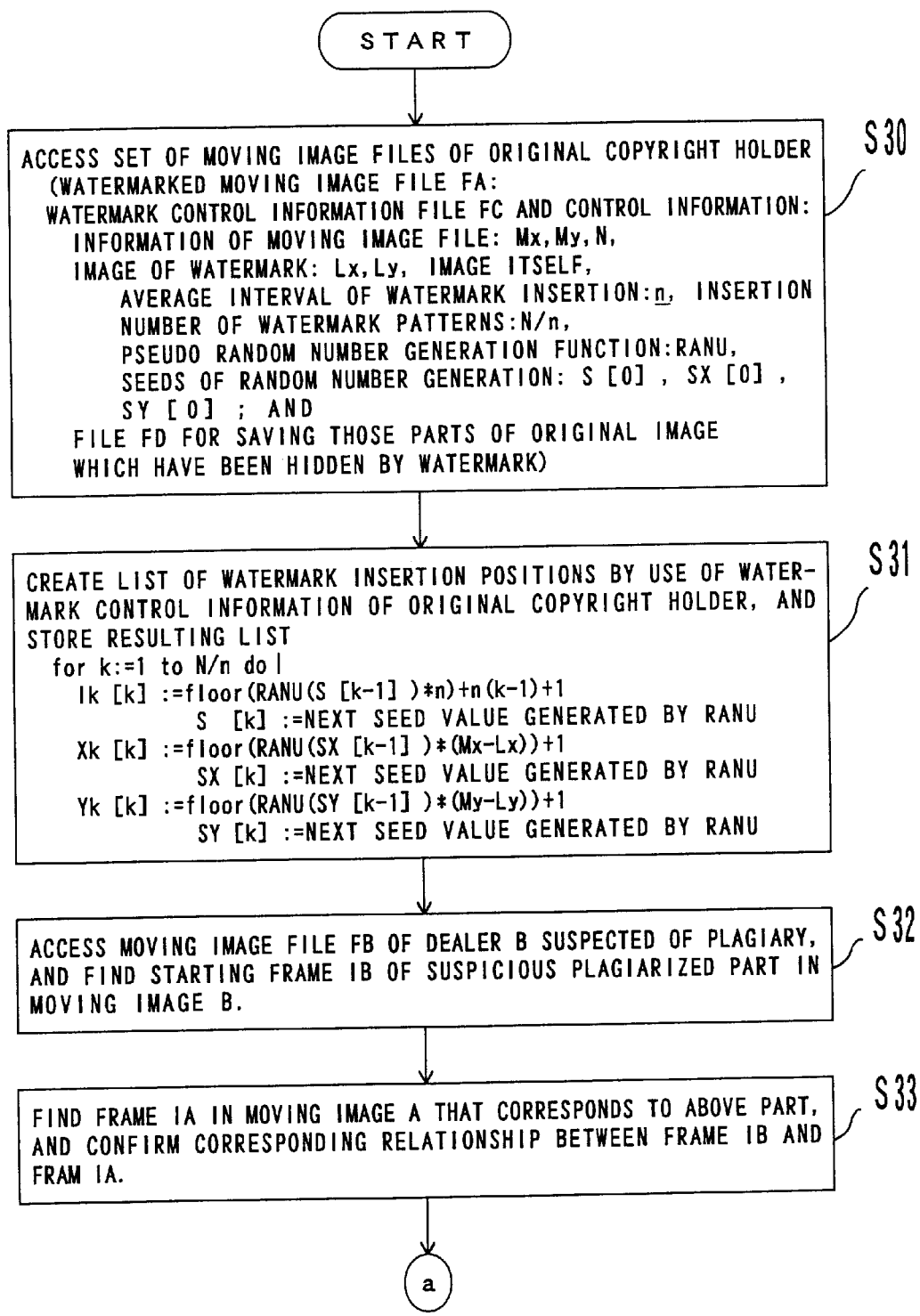

FIGS. 21 and 22 are flowcharts showing a process for verifying the copyright against the moving image of suspected piracy. Referring to the figure, when the process has been started, the set of the moving image files of the original copyright holder A are accessed at step S30. Data to be accessed here are the same as mentioned at step S21 in FIG. 15. That is, they are the contents of the watermarked moving-image file FA, the file FC storing the watermark control information therein, as well as the control information, and the saving file FD in which the parts of the original image hidden by the watermark are saved.

Subsequently, at step S31, the list of watermark insertion positions is created using the watermark control information of the original copyright holder A, and the resulting list is stored. In creating the list, the frame numbers "Ik" and the coordinates "Xk, Yk" of the watermark insertion positions in the watermarked frames are computed for the frame number variable k:=1~N/n of the watermarked frames in which the watermark is inserted, in the same manner as at step S23 in FIG. 15.

At next step S32, the moving image file FB of the dealer B suspected of plagiary is accessed so as to find the starting frame IB of a suspected plagiarized part in the moving image of the dealer B. At step S33, a frame IA in the moving image of the original copyright holder A as corresponds to the above part is searched for so as to confirm the corresponding relationship between the frames IB and IA. Thereafter, processing at steps S34~S37 in FIG. 22 is iterated.

At step S34, the number of the first frame bearing the inserted watermark information is obtained from within the moving image of the copyright holder A beyond the frame number IA, and the images of the obtained frame number in the A's moving image and a correspondent frame number in the B's moving image are compared by feeding the A's moving image and the B's moving image of suspected plagiary in frame feed modes. In the comparison, the contents of the file FD in which the parts of the original moving image not watermarked yet are stored and which is kept in custody on the side of the original copyright holder A are also utilized as may be needed.

Subsequently, at step S35, the result of the comparison between the A's image and B's image is judged as to situations (a)~(e), and the judgement is recorded. The situation (a) is a case where the watermark of the copyright holder A remains in the B's image, while the situation (b) is a case where the frame of the A's moving image at issue is skipped in the B's moving image. The situation (c) is a case where, in the B's moving image, the copyright indication of the copyright holder A is overwritten by that of the dealer B in an erasing form. In the situation (d), the copyright indication of the copyright holder A is not existent in the image B, and the part is close to the original image of the copyright holder A before the watermark insertion, but it is somewhat unnatural. In the situation (e), the image of the frame in the B's moving image matches completely with the original image of the copyright holder A before the watermark insertion.

When the result has been recorded at step S35, whether or not similar images are continuing in the two, A's and B's moving images is decided at step S36. Subject to the decision that the similar images are continuing, the value of the variable k is incremented at step S37. Thereafter, the processing of step S34 et seq. is iterated.

Subject to the decision at step S36 that the similar images are not continuing in the two, A's and B's moving images, the results of the comparisons at step S35 are synthetically judged at step S38. As a conclusion (1), when the case (a) exists even if once, it is synthetically judged that the suspicion of plagiary by the dealer B is confirmed.

As a conclusion (2), in a case where the result (b) or (c) has been obtained in all the comparisons, the suspicion of plagiary is judged almost confirmed.

As a conclusion (3), in a case where the result (b) or (c) has been obtained in most of the comparisons and where the result (d) or (e) has been obtained in some of the comparisons, the suspicion of plagiary is decided very certain.

As a conclusion (4), in a case where the result (b), (c) or (d) exists in some of the comparisons, the suspicion of plagiary is decided strong.

As a conclusion (5), when all the comparisons has fallen under the case (e), it is decided that the dealer B would have obtained the original moving image in which the watermark was not inserted by the copyright holder A yet, or that the dealer B would have perfectly restored the original image not bearing the inserted watermark yet, by any method.

FIG. 23 is a diagram for explaining examples of the results of the synthetic decisions which are rendered at step S38 of the flowchart in FIG. 22, in correspondence with the judged results at step S35. As shown in FIG. 23, in the case where the judged result (a) has been obtained as to all the frames of the suspected plagiary part or even if in one of the frames, the synthetic decision is the result (1). In the case where the judged result (b) or (c) has been obtained as to all the frames, the synthetic decision is the result (2). In the case where the judged result (b) or (c) has been obtained in most of the frames and where the judged result (d) or (e) has been obtained in some of the frames, the synthetic decision is the result (3). In the presence of the judged result (b), (c) or (d) in some of the frames, the synthetic decision is the result (4), and in the presence of the judged result (e) in all the frames, the synthetic decision is the result (5).

Thus far, the insertion of the copyright indication being the watermark information has been described in detail. Now, there will be described the insertion of copy restriction information into a moving image, and the video reproduction and recording of a moving-image storage medium bearing a recorded copy restriction code.

As stated before, the insertion of the copy restriction information complies with the Call for Proposals issued by the CPTWG/DHSG, and the basic idea of the present invention in this regard becomes as indicated by the following items (1)~(10):

(1) The concept of the DHS watermark according to the CPTWG/DHSG as explained before is fundamentally broken up, and two sorts of information are employed.

The first is information indicative of a copy control mode. This information is not handled as a watermark, but it is set as definite control information which is processed by hardware.

The second is information for presenting copyright. This information is handled in the state in which it is put in moving image data as a watermark. The watermark need not be detected for the control of copying or duplication.

It is the basic idea of the present invention to conjointly use the two sorts of decomposed information.

(2) The copy control modes include the three kinds of modes in the Call for Proposals according to the CPTWG/DHSG, and are not restricted to these three kinds of modes. At least, an "any-copy mode" which permits duplication any number of times is added to establish at least four kinds of copy control modes. These four kinds of control modes are illustrated in FIG. 24.

(3) As the extension of the copy control modes, it is also possible to introduce any of a contrivance for restriction based on the number of generations of duplication, a contrivance for restriction based on the number of children in duplication, and a contrivance for restriction in which the first and second contrivances are combined.

(4) The information indicative of the copy control mode (termed the "copy control code") is stated (stored) in a control information area for the whole moving-image file and a control information area for each frame or a group of frames constituting the moving image. In a medium drive such as video recording/reproduction apparatus, the copy control code is directly processed hardware-wise. Thus, the copy control mode is reliably detected and entered in a video recording operation, and the general viewers can be prevented from pirating the moving image data.

(5) A medium which is capable of video recording and which has a write protection area, includes a data area into/from which an image can be recorded/reproduced by the ordinary user, and the protected control data area into which a vendor writes data initially and which is processed only hardware-wise thenceforth. In this case, the copy control code is written into the protected control data area and is protected from the user.

(6) In a case where the information for presenting copyright is inserted as the watermark, the scheme of the visible watermark as described before is completely adopted, and the visible watermark is inserted into the data in the data area of the moving image.

(7) Further, in order to intensify the prevention of piracy, a watermark camouflaged so as to be difficult of visual perception (that is, an "invisible watermark") may well be inserted into a plurality of frames selected as desired, in addition to the visible watermark. As the watermark which is additionally inserted in this case, one of a type which is written in a spatial region is more desirable than one of a type which is written after conversion into a frequency region, from the viewpoint of easy processing.

(8) The visible watermark written in the data area of the moving image (including also the additionally inserted invisible watermark in the preceding item (7)) may be checked only when piracy is suspected. In the usual video recording/reproduction or in the transmission process of broadcast, communication or the like, the watermark is merely handled as part of the ordinary moving-image data, and any special process such as the detection of the watermark is not required. In this point, the watermark of the present invention is basically different from the DHS watermark suggested in the Call for Proposals issued by the CPTWG/DHSG. In this manner, the visible watermark of the present invention need not be detected in the usual processing, so that the video recording/reproduction apparatus can be made very simple in structure and low in cost.

(9) The visible watermark is directly inserted among the data of the frame of the moving image. The moving image data may be either of analog type or of digital type. Besides, in a case where the moving image containing such a visible watermark is stored within a computer, is recorded in a package medium or is transmitted in the form of broadcast or communication, it may be held as the original moving image, be subjected to A/D or D/A conversion, be compressed and encoded in conformity with the MPEG method or the like, or/and be encrypted. Such various processes ought to be selected in accordance with the purpose of use of the moving image or the function of the equipment for the moving image. By way of example, in storing the moving image in a digital package such as CD-ROM, it is favorable owing to reduction in a required storage capacity that the digital moving image is compressed by the MPEG method and then recorded.

(10) The copy control codes in the present invention are set in a reserved bit area for control codes as included in the existing medium (such as video tape or CD-ROM) or in the protocol of the existing broadcast/communication (such as television broadcast or Internet communication). Thus, apparatuses, media, protocols, contents, processing methods, etc. concerning moving images that adopt the scheme of the present invention set anew can be made compatible with those based on the existing schemes which have hitherto been in wide use. In more detail, the compatibilities are as stated below:

The medium, protocol or content created by the apparatus and processing method which conform to the new scheme of the present invention contains the copy control modes and the visible watermark. The apparatus and processing method based on the conventional schemes can handle them similarly to the medium, protocol or content based on the conventional schemes. In actuality, in the apparatus and processing method based on the conventional schemes, the copy control modes are stated, but they are not used (that is, a request for video recording or a request for reproduction is complied with as in the any-copy mode), and the visible watermark is kept intact (is recorded, presented or transmitted) as part of moving image data.

The medium, protocol or content created by the apparatus and processing method based on the conventional schemes does not intentionally contain the copy control modes and the visible watermark. The apparatus and processing method conforming to the new scheme of the present invention can handle the codes and the watermark similarly to those contained in the medium, protocol or content conforming to the new scheme. In actuality, the copy control codes are equivalently cleared, and the copy control mode is regarded as being set in the any-copy mode in the case of the new scheme.

Such compatibilities allow the coexistence of the new scheme of the present invention with the conventional schemes in introducing the new scheme, and permit the apparatuses, processing methods, media, etc. of the new scheme to spread themselves into the market without confusion.

To be noted here is that such compatibilities are warranted for the first time by the following reasons: The copy control codes are set in the reserved bit area, the any-copy mode which is lacked in the copy control modes of the CPTWG/DHSG is added, and this any-copy mode is set as the bit clear code. With only the three kinds of copy control modes presumed by the CPTWG/DHSG, such compatibilities are not warranted, and the apparatus and processing method of the new scheme will not accept the medium, protocol or content of the conventional schemes. Contrariwise, the apparatus and processing method of the conventional schemes will not accept the medium, protocol or content of the new scheme.

As explained in the above items (1)~(10), according to the present invention, the copy control information and the watermark information are used in the definitely distinguished states. The two sorts of information are set, processed and utilized independently of each other. Thus, the present invention comes to have the following features (a)~(h):

(a) The most important feature of the present invention is that the two sorts of information are distinguished and are conjointly used as described above, whereby one sort of information functions to control the permission/rejection of copying or duplication, while the other sort of information functions to verify copyright information which is hidden and retained in a moving image. The synergy of both the functions forms the feature of the present invention. It brings forth the feature which is essentially different from the foregoing "DHS watermark" suggested by the CPTWG/DHSG.

(b) The four kinds of copy control modes shown in FIG. 24 are incarnated, and recording permission/barring or reproduction permission is given in accordance with specifications shown in the figure, in response to a request for video recording or a request for reproducing display.

Especially in the one-copy mode, a child (a copy) can be formed, but the formed copy is set in the no-more-copy mode, so that a copy corresponding to a grandchild cannot be formed. In each of the no-more-copy mode and the never-copy mode, the reproducing display is permitted, but the video recording is rejected. It is accordingly avoidable to form a large number of copies unlawfully.

(c) The any-copy mode has been added as a new copy control mode, and it has been established as one of the formal or regular modes in the new scheme of the present invention. This mode imposes no restriction on duplication or copying even in an apparatus or a processing method conforming to the new scheme, and is equivalent to the fact that video recording is not rejected in conventional video apparatuses. The effect of the formal recognition of this mode is the realization of the compatibilities between the new scheme and conventional schemes. More specifically, at present, there are large quantities of moving image packages and contents based on the conventional schemes for video recording, the video apparatuses of the conventional schemes have been extensively spread in homes and offices, and broadcasts and communications of the conventional schemes are proceeding all over the world. The present invention provides a contrivance according to which, in such a situation, the new scheme is spread into the market without confusion, and the generations of the schemes are altered surely even though slowly.

(d) The copyright holder of an original moving image can determine if he/she allows his/her customers (such as users and viewers) to duplicate the moving image, and can designate his/her will within the medium of the moving image or within the data stream of broadcast or communication in the form of the copy control modes. The will shall be esteemed by apparatuses which adopt the new scheme of the present invention.

(e) As the extension of the copy control modes, it becomes possible to set a certain limit for the number of children or/and to set a certain limit for the generation numbers of descendants. The limits can be set by the original copyright holder, and can be explicitly indicated in the selling/distribution of the moving image.

(f) The fact that copy control codes are set as explicit control information, not as a watermark, so as to be directly handled by hardware, brings forth the effects that the control information can be reliably detected, and that any illegal manipulation by a user can be excluded. Especially when the control information is written into the storage protection area of a storage medium, the user cannot erase or manipulate the control information, and the right of the copyright holder is defended.

(g) In a video tape, broadcast, communication or the like, the copy control code is set every frame of a moving image or every plurality of frames thereof. Therefore, the copy control codes are normally detected during the traveling/broadcast/communication of the moving image. Even when video recording has been started at any intermediate part of the moving image, the copy control mode is decided quickly (within one second), and the disposal of the permission or rejection of the video recording is taken. On this occasion, the detection of the copy control code misses very rarely unlike the detection of the DHS watermark.

(h) As a matter of course, the copy control codes do not exert any bad influence such as the distortion of a displayed image, in the reproducing display of the moving image, and they do not afford any offensive feeling to viewers.

Next, the insertion of the visible watermark as stated before has the following features (i)~(k) in relation to the Call for Proposals issued by the CPTWG/DHSG:

(i) While the watermark is inserted among the data of the moving image, it need not be normally detected during video recording or reproduction for such a purpose as the control of copying or duplication. In this point, the visible watermark is essentially different from the DHS watermark of the CPTWG/DHSG. As a result, the processing of a video recording apparatus or a receiving apparatus for broadcast/communication becomes very simple, and moving image transmission, etc. at high speed can be realized without any problem.

(j) The visible watermark is inserted as part of the moving image data, and it is applicable to all the aspects of utilization of the moving image. Besides, the watermark does not degrade processing capabilities at all in the transmission of broadcast, communication or the like and in ordinary video processing (such as video recording/reproduction, A-D/D-A conversion, compression/expansion, and encryption/decryption). In addition, the watermark itself is robust.

(k) When the moving image is displayed in a frame feed mode or a slow motion mode, the visible watermark is visually perceivable easily and clearly. When a copyright indication is inserted in an evident form, viewers notice the copyright indication soon. Unlike the DHS watermark, the copyright indication need not be normally detected, and it may be confirmed by such a method only when the ownership of copyright is to be verified.

Figure 25:
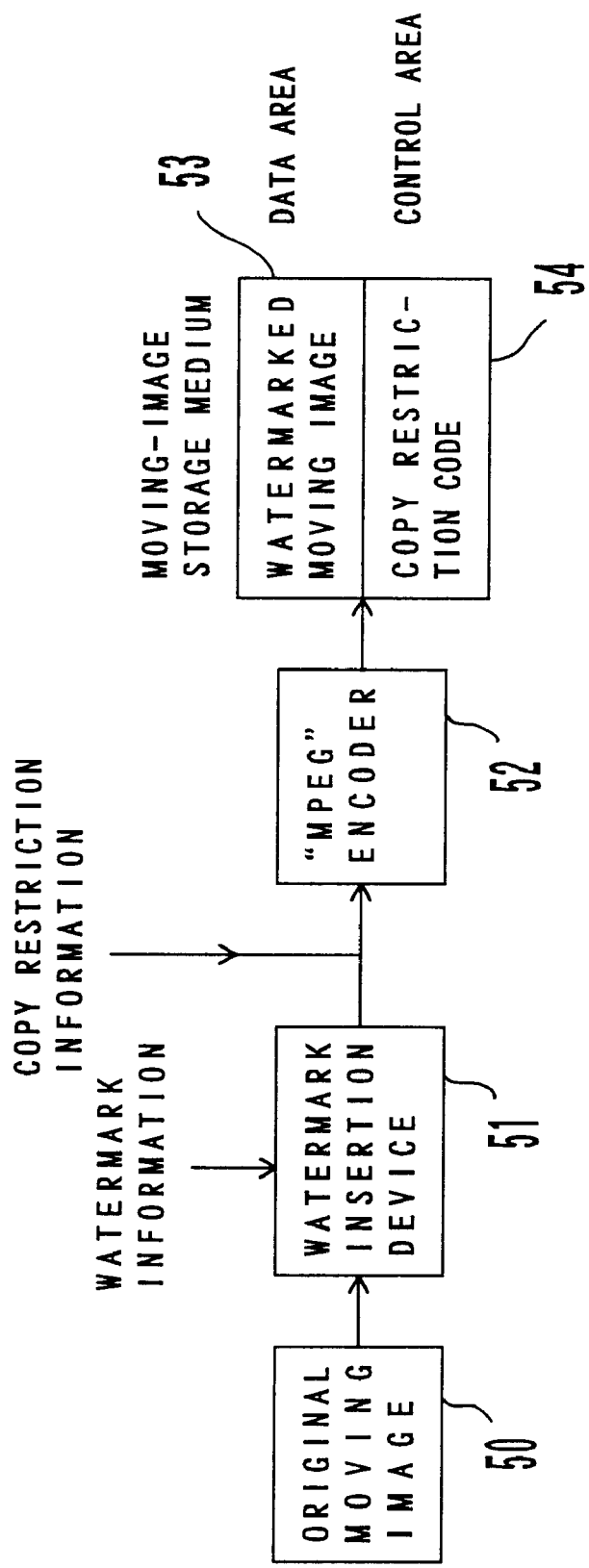
FIG. 25 is a diagram for explaining the basic operations of a system for inserting watermark information and copy restriction information.

Aspects of performance for actualizing the above features of the present invention will be described below with reference to the drawings. FIG. 25 is a diagram for explaining the basic operations of a system for inserting watermark information and copy restriction information. Referring to the figure, the watermark information is inserted into an original moving image 50 by a watermark insertion device 51 as explained before. Also, the copy restriction information is inserted into a control (data storing) area. The moving image after the insertion is subjected to data compression by an MPEG encoder 52. Then, a moving-image storage medium has been created. The data area of the medium bears a watermarked moving image 53, while the control area thereof bears a copy restriction code 54.

Figure 26:
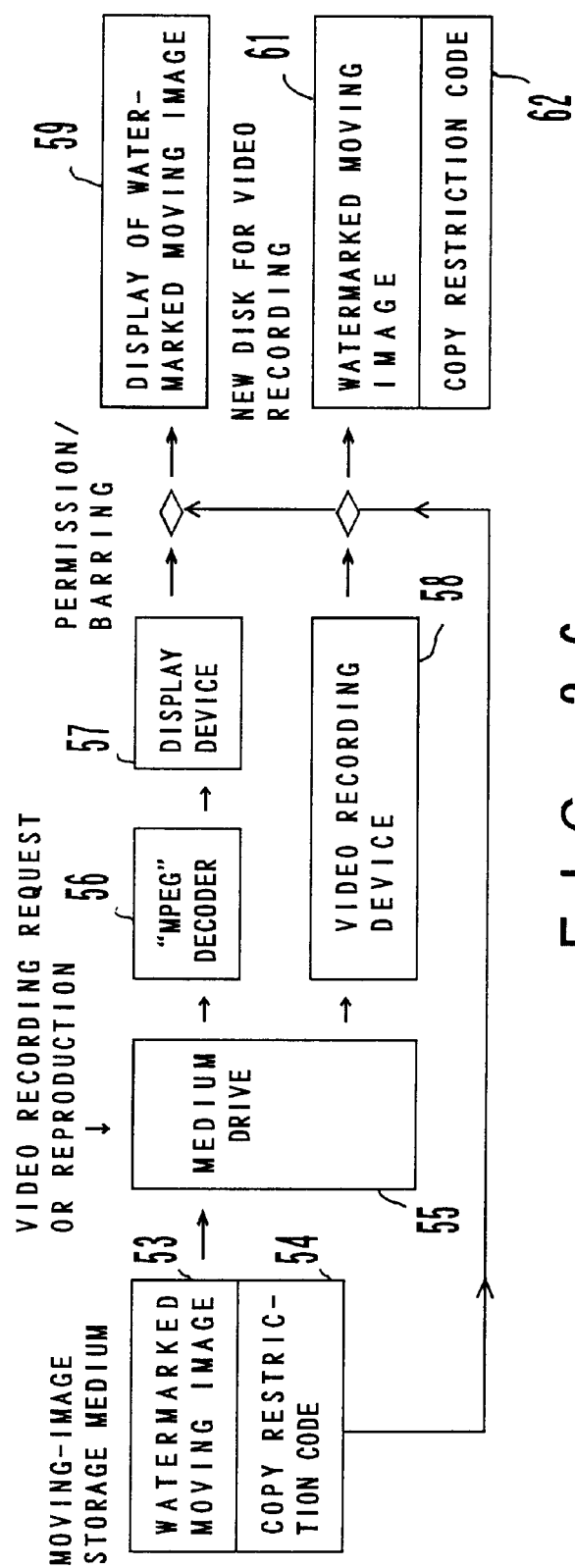
FIG. 26 is a diagram for explaining the operation of a moving-image recording/reproduction apparatus as complies with a request for recording or reproducing the contents of a storage medium.

FIG. 26 is a diagram for explaining the operation of a video recording/reproduction apparatus according to the present invention as complies with a request for recording or reproducing the contents of a moving-image storage medium. Referring to the figure, the moving-image storage medium is set in a medium drive 55 in correspondence with the request for video recording or reproduction. In response to the request for reproducing a moving image stored in the storage medium, compressed data are expanded by an MPEG decoder 56, and the display 59 of the watermarked moving image (53) is presented by a display device 57 in a case where the reproduction is permitted. In response to the request for video recording, the content of a copy restriction code (54) is decided by the medium drive 55, and a new video-recording disk which bears a watermarked moving image 61 and a copy restriction code 62 is created by a video recording device 58 in a case where the video recording is permitted.

FIG. 27 is a diagram for explaining a copyright protection scheme which employs both copy restriction information and watermark information. The upper part of the figure illustrates a process in which moving image data are created by the original copyright holder of a moving image. Although the illustration resembles FIG. 25, it is intended to clarify that the treatments of the watermark information and the copy control information are basically separate and independent from each other. First, the watermark information is inserted into an original moving image 50 as watermark insertion 65, thereby to create a watermarked moving image 66. Thereafter, a control designation 67 is performed using the copy control information, thereby to create control-information bearing moving-image data.

More specifically, after the original copyright holder has created the moving image, he/she can insert a watermark for indicating the copyright etc. of the moving image. The watermark insertion should preferably conform to the foregoing scheme of the visible watermark. Thereafter, the original copyright holder or a transmitter designates the copy control information in a control data area. The control data area includes at least two sorts of areas, one of which is an area for collectively stipulating the whole moving image information (one content) and the other of which is an area for stipulating every frame of the moving image or every group of frames thereof. It is important that especially the latter is affixed for the control information in a case where the moving image data are processed linearly in, for example, a storage medium of tape form, or the real time transmission of broadcast/communication or the like. In this way, the watermarked moving-image data bearing the control information are obtained.

The middle part of FIG. 27 illustrates the various circulation or distribution processes of the created moving image. The aspects include the four types; package circulation 70, 71, broadcast propagation 72, 73, communication conveyance 74, 75, and transfer and duplication 76, 77 by a computer.

The first aspect of the moving image conforming to the copyright protection scheme as shown in FIG. 27 is such that the moving image is stored in any of package media, which is distributed as an article. The package media are in various forms, such as a video tape of analog type, a CD-ROM, an MO disk, a DVD and a video tape of digital type. Therefore, the moving image is written into each of the package media in conformity with the format of the package medium. On this occasion, the moving image is often subjected to D-A conversion, data compression based on the MPEG scheme or the like, encryption, etc. After having been distributed as the article, the package medium is set on an apparatus (such as a VTR or a CD-ROM player) having a readout function therefor, and it undergoes necessary processes such as decryption and data expansion. Subsequently, the moving image data are restored in real time within the apparatus, and they are delivered to processes shown at the lower part of FIG. 27.

The second aspect of the moving image as shown in FIG. 27 is such that the moving image is distributed by broadcast. The broadcast includes terrestrial broadcast, cable television, satellite broadcast, etc. In addition, it is classified into analog broadcast and digital broadcast. A broadcasting station incorporates the moving image data and the affixed control data in an appropriate format (if necessary, after data compression and encryption) and transmits them. A receiving set having received the broadcast accepts the moving image data in real time after performing necessary processes such as decryption and data expansion.

The third aspect of the moving image as shown in FIG. 27 corresponds to a case where the moving image is distributed by communication. The communication includes a large number of new forms such as video on demand, television conference, network games, Internet information retrieval, and E-mail annexing. Moreover, communication networks include many types such as wire/radio/mobile types, and communication protocols include many sorts. If necessary, the transmitter of the communication can subject the moving image data bearing the control information, to processes such as data compression and encryption, whereupon he/she transmits the data in accordance with a format stipulated in each communication scheme. The recipient of the communication having received the transmitted data accepts the moving image data in real time (after performing necessary processes such as decryption and data expansion).

The fourth aspect of the moving image as shown in FIG. 27 is such that the moving image is stored by the computer, and that the resulting data file is transferred or duplicated. Also this aspect includes various cases. There are considered a case where the moving image is duplicated for backup in the identical personal computer by a certain user, a case where it is transferred to another user and is duplicated in a LAN, a case where it is transferred and duplicated in a computer network of wider area, and so forth. It is considered that, in such a case, the moving image will be usually transferred and duplicated in any desired format prepared in the data file. It is the actual situation, however, that a computer user who is an expert having moving-image editing tools can manipulate the moving image data and the copy control information.

The lower part of FIG. 27 illustrates the processes for the recording and reproduction of the moving image data that cope with the various cases of the above distribution aspects. Although the illustration resembles FIG. 26, a readout/reception device 80, a display device 81 and a video recording device 82 coping with the distribution aspects are disposed instead of the medium drive 55, the MPEG decoder 56, the display device 57 and the video recording device 58. Data restored in correspondence with any of the distribution aspects are composed of a watermarked moving image 68 and copy control information 69, and they are processed by the readout/reception device 80.

The moving-image readout/reception device 80 is usually furnished with the reproducing display device 81 or/and the video recording (storing) device 82, which is/are requested to display or/and record the moving image by the user. Herein, the scheme of the present invention features that, in response to the request, the copy control information contained in the read-out/received data controls if the moving image is to be actually outputted (to be recorded or/and displayed), so as to permit or bar the image output. In particular, in the readout/reception device 80 conforming to the scheme of the present invention, the copy control information is processed by hardware, and hence, it cannot be intentionally altered by the user. Besides, the copy control information is also detected every frame or every group of frames in the readout/reception device 80 for the moving image. Therefore, even in such a case where the package medium (especially, video tape) has been read out from the intermediate part of the moving image or where the broadcast or communication has been received from the intermediate part of the moving image, the output control can be performed immediately.

As shown on the right side of the lower part of FIG. 27, it is the moving image bearing the watermark information (especially, the visible watermark) that is displayed when the display (reproduction) request has been permitted. The moving-image readout/reception device 80 does not perform any special process at all as regards the watermark information. It does not detect the watermark information, either. Whether or not the watermark information is borne, the device 80 operates to execute the ordinary moving-image display irrespective of the watermark information. Besides, the visible watermark affords quite no offensive feeling to a viewer.

In a duplicate copy formed by the permission of the video recording, the same watermark information (especially, the visible watermark) as in the original moving image is inserted among the moving image data 61 stored in a data area. In addition, copy control information 62 for a child copy is written into a control data area hardware-wise in accordance with the specifications of the scheme of the present invention. In particular, the no-more-copy mode is written into the child copy accepted by the one-copy mode.

What aspect the duplicate copy formed here is in, depends upon the moving-image readout/reception device 80 which is employed. In the commonest aspect, the duplicate copy is outputted in the form of a package medium for the viewer. This aspect corresponds to a case where a video tape storing the moving image therein is duplicated, or where a broadcast program is received so as to record the moving image in an MO disk or a DVD. On this occasion, the output medium can return to the distribution process of the package medium as shown on the left side of the middle stage of FIG. 27. In a higher degree of utilization, there will be a case where the moving image is stored as the computer file of a personal computer or the like. On this occasion, the output moving-image storage obtained at the lower part of FIG. 27 might be added to a new distribution path in the form of the control-information bearing moving-image data as shown on the right side of the upper part of FIG. 27. In this way, the scheme of the present invention can pass any desired distribution path or processing path, such as the package medium, broadcast, communication or computer transfer, without an intervening fence.

Meanwhile, the conventional schemes are regarded as that scheme of the present invention in which the copy control information is cleared to zero (without being added). Herein, the readout/reception device 80 does not have the function of processing the copy control information and barring the user's request (consequently, it permits all the requests). The watermark information is not actually borne, either. These facts signify that, even when the conventional schemes and the new scheme of the present invention are mixedly used in the whole operation illustrated in FIG. 27, any hindering part is not found at all. Heretofore, it has been hardly practiced to restrict copying or duplication hardware-wise (this situation corresponds to the any-copy mode according to the present invention as shown in FIG. 24). It is accordingly understood that, in the case where the protection of the copyright holder is to be attained by introducing the copy control modes as in the specifications of the CPTWG/DHSG (in FIG. 1) or the specifications of the present invention (in FIG. 24), the specifications of the CPTWG/DHSG (in FIG. 1) are insufficient for spreading the copy control modes while compatibilities with extensive conventional systems are held, the specifications of the present invention (in FIG. 24) being indispensable therefor.

FIG. 28 is a table exemplifying copy control codes which serve to realize the copy control modes shown in FIG. 24. In the example of FIG. 28, four copy control modes are expressed by codes of 2 bits. In, for example, the one-copy mode, the code for an original disk is "01" indicative of the permission of video recording, but "10" indicative of the rejection of video recording is set as the code for a child being a duplicate disk.

Incidentally, the fact that the any-copy mode is expressed by "00" in the 2-bit expressions of this embodiment, is important for compatibility with the conventional schemes in which no copy restriction is made. Regarding the other three modes, the expressions selected in this embodiment are natural, but they are not always absolute.

As another embodiment, the copy control modes may well be expressed by 3 bits. Also in this case, the any-copy mode is encoded as "000" as the purport of the present invention.

The principal control information of the moving image data, including the copy control codes, the copyright indication thereof, etc. should desirably be stored at locations which cannot be erased by general users. Some of package media, for example, some of MO disks or DVDs have a data area especially protected hardware-wise, in distinction from a general data area. In this case, it is recommendable to write the copy control codes, the copyright indication of the original copyright holder, etc. into the especially protected area.

FIG. 29 is a block diagram showing the structure of a readout/reception device in order to explain how copy control codes are handled therein. Referring to the figure, the readout/reception device 83 includes a data readout portion 84 for reading out moving image data, a reproducing display portion 85 for displaying the data read out, a control code readout portion 86 for reading out the copy control code, a video recording portion 87 for creating copy moving image data when video recording is permitted, and a control code writing portion 88 for writing the control code set for a child.

In case of reproducing and displaying the inputted image information, the readout/reception device 83 operates to send the reproducing display portion 85 the moving image data read out by the data readout portion 84, so as to reproduce and display the moving image. Besides, in case of creating the copy of the inputted moving image data, the control code readout portion 86 reads out the copy control code of the inputted moving image data. Herein, on condition that the moving image data are duplicable, the control code readout portion 86 permits the video recording portion 87 to create the copy of the moving image data read out by the data readout portion 84, and it supplies the control code of the moving image data to the control code writing portion 88. Then, the control code writing portion 88 outputs the supplied control code as updated.

Next, there will be described the form in which copy control codes are stored in the entire moving image data. In general, moving image data have an enormous quantity of information. Even when they are statically stored, storage media include those with which control information for the entirety (for example, control information in the head of the entire moving image data) can be viewed at the same time that any desired image frame is viewed (for example, a memory in a computer, an MO disk, and a DVD), and those with which control information for the entirety cannot be viewed when any desired image frame is viewed (for example, an analog video tape, and a digital video tape). Besides, in a case where the moving image data are being transmitted in real time, for example, where they are being broadcast or communicated or being reproduced from the DVD, only a small number of moving image frames are, in substance, being transmitted in a short time, and information for controlling the entirety cannot be viewed (even when the information is transmitted at the head part of the transmission).

Therefore, especially in the case of storing the moving image data in the tape type medium or transmitting the moving image data in the broadcast or communication, it is important that the major control data such as the copy control codes are contained consecutively (at any storage location, or at any time point of the transmission). The format of the medium or the format (protocol) of the transmission is usually provided with a part (called "header") where the control data are stated, every frame, every subdivision of each frame, or every several frames—several tens frames. Accordingly, also the copy control codes should preferably be set as some of such control data.

Figure 30:
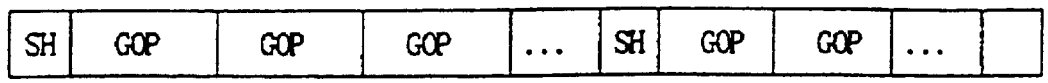
FIG. 30 is a diagram showing the video format of the MPEG.

FIG. 30 is a diagram showing the video format of MPEG1 as well as MPEG2 in order to explain the embedment of copy control information. Here, the minimum unit of a group of frames serving as the unit of random access is "GOP", and information on a time period with respect to a sequence header "SH", etc. are contained at the head of the GOP. Data areas for extensions in the future (Sequence Extension Data, Group Extension Data) are prepared in both the parts SH and GOP. Therefore, the copy control codes conforming to the present invention can be set in the data areas.

Next, the extension of the copy control modes will be described. It is possible by extending the copy control modes to restrict the number (LC) of the duplicate copies of the child generation, and/or to restrict the number (LG) of the generations of descendants. From such viewpoints, the one-copy mode in the specifications shown in FIG. 24 corresponds to a case where the number of children is limitless (the infinite) and where the number of generations is limited to one, and the no-more-copy and never-copy modes correspond to a case where the number of children is limited to zero and where the number of generations is limited to zero. In the conventional case free from the copy restriction (in the any-copy mode), the number of children is the infinite, and the number of generations is also the infinite.

An embodiment which sets copy control modes containing both the restrictions of the number of children LC and the number of generations LG, is as stated below. First, the following 3 bits indicative of the control modes are prepared:

CCC0 0/1 In conclusion, duplication is permitted (0) or not (1) at present

CCC1 0/1 The number of children is limitless (the infinite) (0) or not (1)

CCC2 0/1 The number of generations is limitless (the infinite) (0) or not (1)

Besides, two integral areas of suitable size are prepared, and the restrictive number of children LC and the restrictive number of generations LG are set therein.

When indicated with the above 3 bits, the settings of the modes are the any-copy=000, one-copy=001, no-more-copy=101 and never-copy=111. Besides, restricting only the number of children is set as "010", restricting only the number of generations is set as "001", and restricting both the numbers is set as "011" at the time of start.

Figure 31:
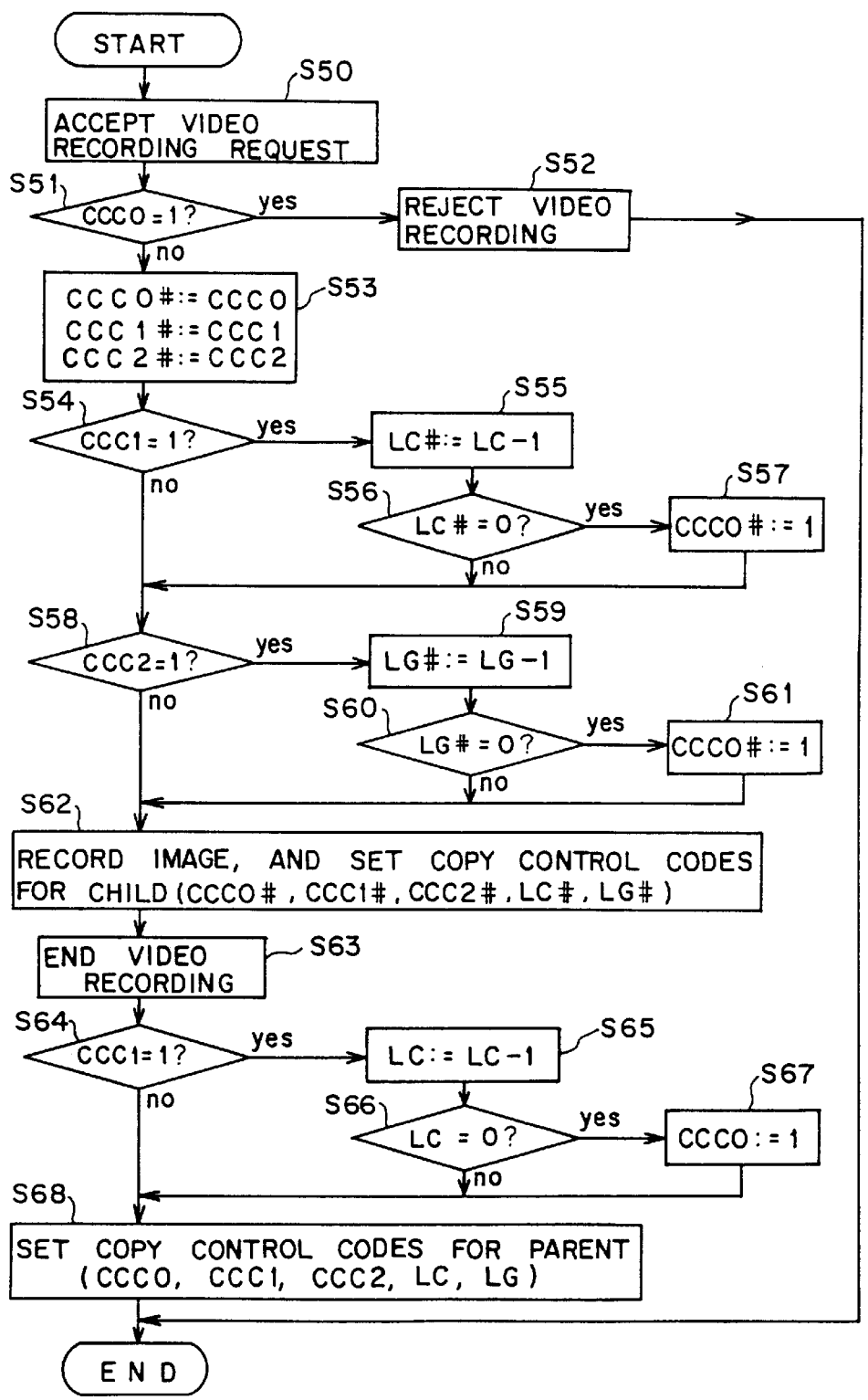
FIG. 31 is a flowchart showing a process which is executed using extended copy control modes.

FIG. 31 is a flowchart showing a process which is executed using the extended copy control modes, in compliance with a request for video recording. In the figure, control codes set for a child (a duplicate disk) are succeeded by mark "#".

Referring to FIG. 31, when the process has been started, the video recording request is accepted at step S50. At next step S51, the value of the code CCC0 indicating whether or not duplication or copying is permitted is decided. If the value is "1", the video recording is rejected at step S52, whereupon the process is ended.

On condition that the duplication is permitted, the contents of 3 bits for a child are set to be the same as those for a parent, namely, for an original disk, at step S53. Thereafter, the value of the code CCC1 indicating whether or not the number of copies is restricted is decided at step S54. If the code CCC1 is "1", the number of copies is limited, and hence, a value with "1" subtracted from the value LC for the parent is set as the copy restriction number LC# for the child at step S55. Subsequently, whether or not the number LC# has become "0" is decided at step S56. When the number LC# has become "0", the value of the code CCC0 for the child is set at "1" indicative of the barring of duplication at step S57. Then, the control flow shifts to the processing of step S58. The control flow also shifts to the processing of step S58 when the code CCC1 is not "1" at step S54, and when the number LC# is not "0" at step S56.

At steps S58~S61, processing similar to that of steps S54~S57 is executed as to the number of generations. A value with "1" subtracted from the value LG for the parent is set as the generation restriction number LG# for the child. Lastly, at step S62, the video recording for the child or the duplication is executed, and copy control codes for the child are set. Then, the process is ended. Next, steps S63~S68 checks if the parent cannot form a child (copy) any longer, in such a way that the copy restriction number LC for the parent is decreased "1" in succession after the end of the video recording. Copy control codes for the parent are set at step S68.

Incidentally, it is also allowed to employ a contrivance in which "1" is not subtracted from the number LC at step S55. Further, it is allowed that the restriction of the number of children to be set at the time of the creation of the parent by the copyright holder be stored as a value "LC0" beforehand, and that the value "LC0" be substituted into the number LC# at step S55. On this occasion, steps S56 and S57 are dispensed with, and step S55 is followed by step S58.

Figure 32:
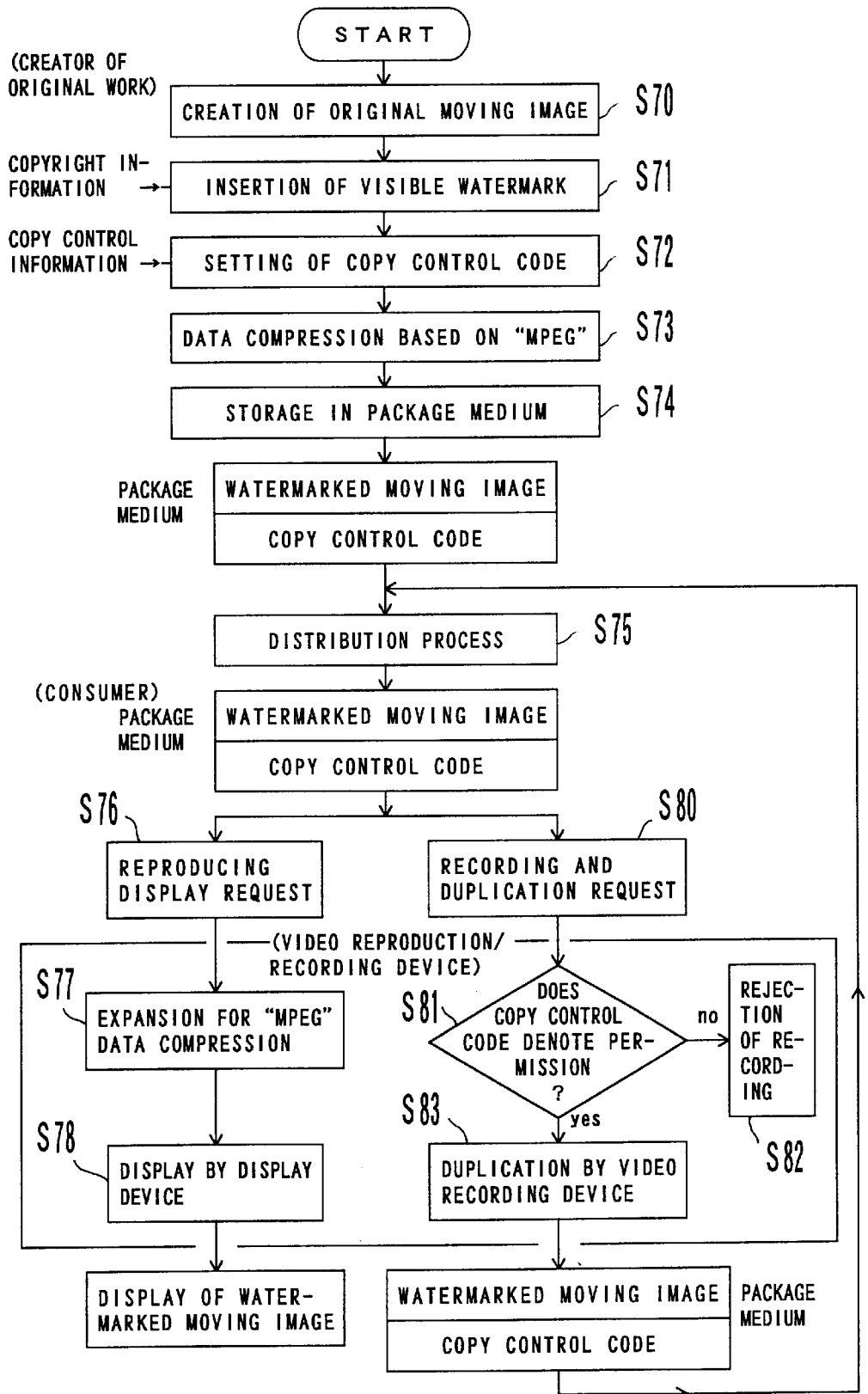
FIG. 32 is a diagram for explaining the course of the creation, circulation, and video reproduction/recording of a package medium.

FIG. 32 is a diagram for explaining the course of the creation of an original moving image in a package medium by a creator, the circulation or distribution of the package medium, and video reproduction/recording of the moving image by a viewer, the package medium being an MO disk, a DVD or a digital video tape by way of example. FIG. 32 consists chiefly in altering the illustrative form of FIG. 27, and it is therefore omitted from detailed description. In the case of FIG. 32, before the moving image is stored in the package medium, it is subjected to data compression based on the MPEG scheme at step S73. In reproducing and displaying the moving image, the compressed data are expanded by the MPEG scheme at step S77. In contrast, in case of a request for recording and duplication, the compressed data are duplicated without the processing of the MPEG scheme. It is as thus far stated that the copy control code is checked at step S81 prior to the recording and duplication, whereupon the recording is sometimes rejected. Besides, a package medium obtained by the recording and duplication in this way is delivered to a friend or the like and is distributed among consumers.

Lastly, the architecture of a computer system which incarnates a system for inserting a watermark and copy restriction information according to the present invention, and how to load programs in such a computer system from storage media, the programs serving to insert the watermark and the copy restriction information, will be described with reference to FIG. 33 and FIG. 34, respectively.

Figure 33:
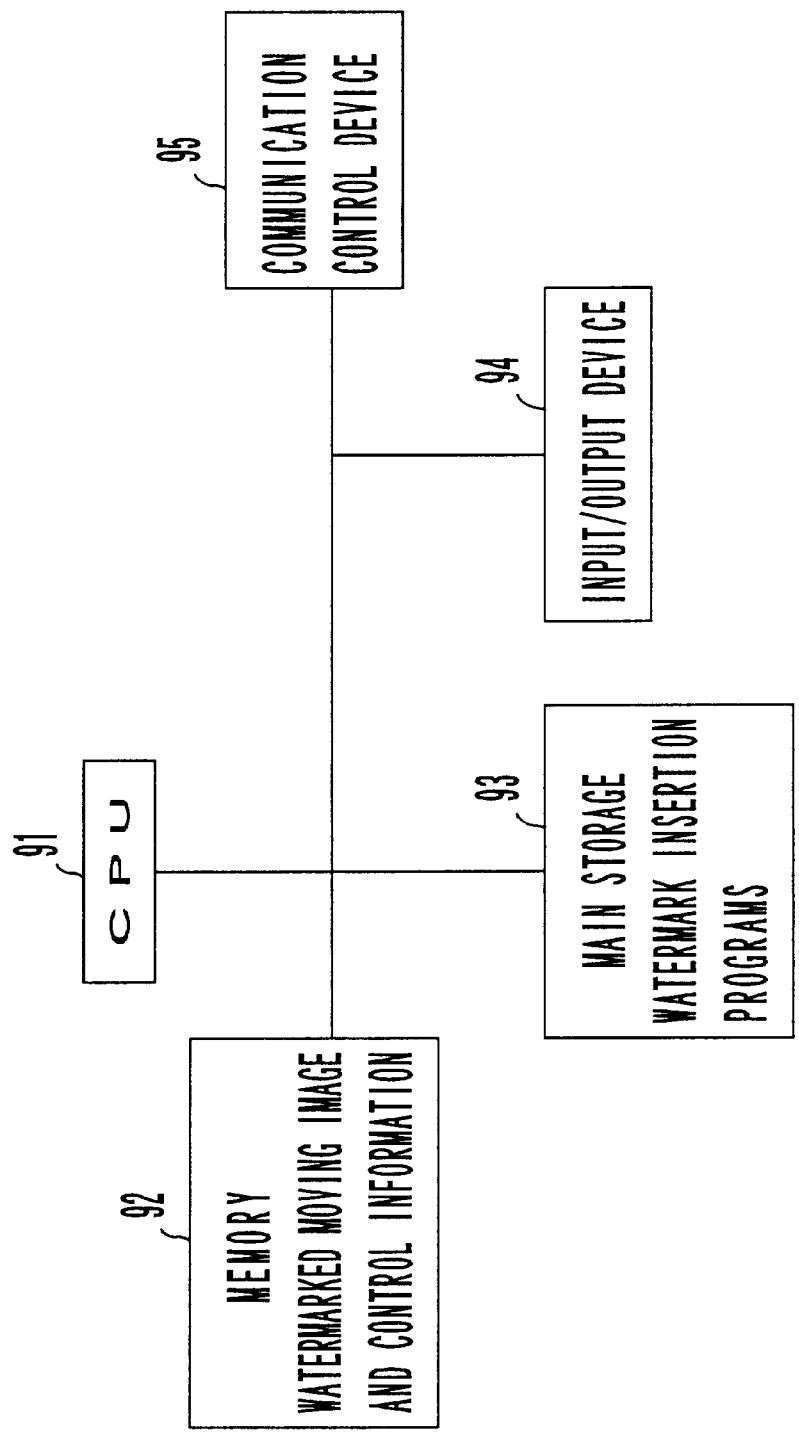
FIG. 33 is a block diagram showing the architecture of a computer system which incarnates a watermark insertion device.

FIG. 33 is a block diagram showing the architecture of the computer system which incarnates the system for inserting the visible watermark and the copy restriction information. Referring to the figure, the computer system includes a central processing unit (CPU) 91 which controls the whole system, a memory 92 which stores therein a moving image bearing the inserted watermark and copy restriction information, and control information items for selecting the numbers of watermark insertion frames and for determining the insertion positions of the watermark information, a main storage 93 in which the programs for inserting the watermark information and the copy restriction information are temporarily stored in order to be run by the CPU 91, an input/output device 94 which serves to input and output moving image data, etc., and a communication control device 95 which serves to transmit and receive the moving image data, etc. inputted and outputted through, for example, a network.

Figure 34:
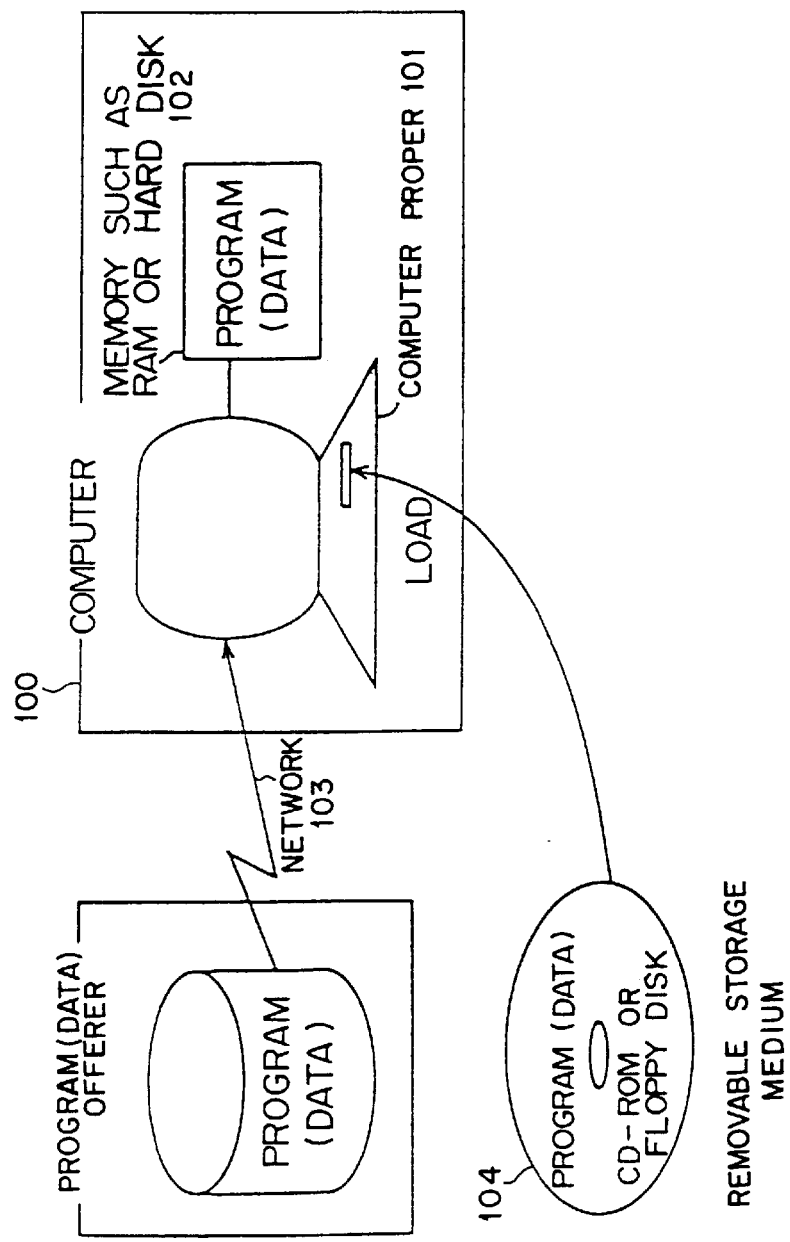
FIG. 34 is a diagram for explaining the loading of a watermark inserting program into a computer.

FIG. 34 is a diagram for explaining the loading of a computer with the programs for inserting the watermark information and the copy restriction information. Referring to the figure, the computer 100 includes a computer proper 101 and a memory 102. The computer proper 101 can be loaded with the programs, etc. from a removable storage medium 104, and can also be loaded with the programs, etc. from a program provider side through a network 103.

The programs based on the present invention and the programs shown in the flowcharts are stored in the memory 102, and they are run by the computer proper 101. Here, the memory 102 is a random access memory (RAM) or a hard disk by way of example.

Besides the programs for inserting the watermark information and the copy restriction information, a program for executing the process for restoring the original image with the watermark information not inserted yet, etc. are stored in the removable storage medium 104. The watermark insertion, etc. can also be performed by loading the programs into the computer 100. Usable as the removable storage medium 104 is any storage medium which is commercially available and which is distributable, such as a memory card, a floppy disk, a CD-ROM (compact-disk read only memory), an optical disk or a magneto-optical disk. Further, the insertion of the watermark information, etc. can be performed in such a way that the programs for inserting the watermark information and the copy restriction information are sent from the side of a program provider to the side of the computer 100 through the network 103 so as to be loaded.

As described above, the present invention has proposed a new scheme for protecting the copyright of a moving image (straightforwardly, as set by the CPTWG/DHSG). The scheme is applicable over a very wide range utilizing moving images. More specifically, the scheme can be used for the creation and storage of moving image data, the transmission and reception thereof, the reproduction/display thereof and the recording/duplication thereof, in all the aspects of distribution in the form of package media and transmission in broadcast, communication, computer transfer, etc. Concretely, the following effects are mentioned:

(a) As the scheme for the copyright protection, a scheme in which duplication itself is restricted using copy control modes is employed conjointly with a scheme which prevents the erasing of copyright indication on the basis of watermarked moving image data, whereby the synergetic effect of both the schemes has been realized.

(b) In the protection based on the copy control modes, not only the specifications of a one-copy mode, a no-more-copy mode and a never-copy mode have been realized, but also an any-copy mode has been simultaneously realized.

Further, in a copy control, the mode of restricting the number of children and/or restricting the number of generations has been realized. As an effect, an original copyright holder can set an appropriate copy restriction for his/her moving image work. Besides, in general, not only the right of the original copyright holder, but also the right of a consumer having purchased/gained the work is to be considered in the copy restriction. The multifarious (and flexible) ways of restricting copies as in the present invention will open a course for entrusting the copy restriction to social adjustments.

(c) Copy control codes are stated in an especially protected data area, and are handled hardware-wise in a readout/reception device. These are effective to protect the codes from an intentional manipulation by a user.

(d) In both the readout of a tape type medium and the real-time transmission of broadcast/communication or the like, the copy control codes can be detected normally and consecutively. Therefore, the copy restriction can be judged in a short time (within one second) anytime and correctly.

(e) The copy restriction scheme of the present invention includes conventional schemes as the any-copy mode, and is therefore compatible with the conventional schemes perfectly. This fact guarantees that an apparatus, a medium, broadcast/communication schemes, etc. adopting the new scheme of the present invention be utilizable and serviceable without any trouble in the whole system of the conventional schemes. This affords a basis for spreading the new scheme of the copyright protection into the society without confusion, and is a great effect of the present invention.

(f) Information such as the copyright indication is inserted into the moving image data in the form of the watermark, especially in the form of the visible watermark. Thus, the copyright indication can be held everywhere in the moving image data in the form in which it is visually perceivable clearly in a static image, without damaging the quality of the original moving image and without affording any offensive feeling to a viewer.

(g) The watermark is inserted at random positions in frames selected at irregular intervals. The general users do not notice the existence of the watermark, and they cannot remove the watermark even when they have noticed the existence. It is very difficult to remove the visible watermark without traces and to obtain a moving image close to the original one, and it becomes a job which does not pay, even for a dealer who intends to unlawfully pirate. Therefore, the indication of the original copyright holder based on the watermark has the effect of being held considerably secure.

(h) Since, in the present invention, the watermark information is not used for the purpose of the copy restriction, it need not be detected in the video recording apparatuses of the general viewers. Besides, at all the stages of moving image processing, the watermark is processed as mere part of the moving image data. As a result, the watermark does not exert any bad influence on the algorithm and performance of the moving image processing at all. Moreover, the watermark is less prone to be deteriorated by various image processing, and the copyright indication can be sustained for long.

What is claimed is:

1. A watermark insertion device inserting watermark information into a moving image composed of a plurality of frames, comprising:
    a frame selection unit selecting frames into which said watermark information is to be inserted, at irregular intervals from among the plurality of frames; and
    a watermark-information insertion unit in communication with the frame selection unit and inserting said watermark information into the selected frames, wherein said watermark-information insertion unit decides a color and a tonal density of a part of the moving image in inserting said watermark information, the image part surrounding that position in each of said selected frames at which said watermark information is to be inserted, and said watermark-information insertion unit inserts the watermark information whose color and tonal density have been adjusted in accordance with results of the decisions.

2. The watermark insertion device according to claim 1, wherein said watermark information is visually perceivable when the moving image is brought to a standstill, and said frame selecting unit selects the frames so that said watermark information is not recognizable in said moving image.

3. The watermark insertion device according to claim 1, wherein said frame selection unit determines the frames to-be-selected by use of random number values which are generated under a controlled condition.

4. A watermark insertion device inserting watermark information into a moving image composed of a plurality of frames, comprising:
    a frame selection unit selecting frames into which said watermark information is to be inserted, at irregular intervals from among the plurality of frames;
    a watermark-information insertion unit in communication with the frame selection unit and inserting said watermark information into the selected frames, wherein said frame selection unit determines the frames to-be-selected by use of random number values which are generated under a controlled condition; and
    a moving-image storage unit storing therein the moving image in which said watermark information has been inserted, together with information indicative of the frames in which said watermark information has been inserted.

5. The watermark insertion device according to claim 3, further comprising:
    moving-image storage unit storing therein information indicative of the controlled condition, together with the moving image in which said watermark information has been inserted.

6. The watermark insertion device according to claim 1, wherein said watermark-information insertion unit determines those positions in said selected frames at which said watermark information is to be inserted, by use of random number values which are generated under a controlled condition.

7. A watermark insertion device inserting watermark information into a moving image composed of a plurality of frames, comprising:
    a frame selection unit selecting frames into which said watermark information is to be inserted, at irregular intervals from among the plurality of frames;
    a watermark-information insertion unit in communication with the frame selection unit and inserting said watermark information into the selected frames, wherein said watermark-information insertion unit determines those positions in said selected frames at which said watermark information is to be inserted, by use of random number values which are generated under a controlled condition; and
    a moving-image unit storing therein information indicative of the insertion positions of said watermark information in said selected frames, together with the moving image in which said watermark information has been inserted.

8. The watermark insertion device according to claim 6, further comprising:
a moving-image storage unit storing therein information indicative of the controlled condition, together with the moving image in which said watermark information has been inserted.

9. The watermark insertion device according to claim 1, wherein said watermark-information insertion unit selects said watermark information from a plurality of sorts of watermark information prepared beforehand.

10. The watermark insertion device according to claim 1, wherein said watermark-information insertion unit selects at least one pattern from a plurality of sorts of patterns prepared beforehand and then inserts the at least one pattern, in addition to said watermark information, thereby improving verification.

11. A watermark insertion device inserting watermark information into a moving image composed of a plurality of frames, comprising:
a frame selection unit selecting frames into which said watermark information is to be inserted, at irregular intervals from among the plurality of frames; and
a watermark-information insertion unit in communication with the frame selection unit and inserting said watermark information into the selected frames, wherein said watermark-information insertion unit inserts patterns which correspond to numbers of the frames selected by said frame selection unit, the numbers indicating positions of said selected frames in the moving image, in addition to said watermark information.

12. The watermark insertion device according to claim 1, wherein said frame selection unit selects the frames so that said selected frames are not successive.

13. The watermark insertion device according to claim 1, wherein said watermark-information insertion unit inserts said watermark information into at least one frame which is successive to any of the frames selected by said frame selection unit.

14. The watermark insertion device according to claim 1, further comprising:
a partial-image storage unit storing therein partial images in said selected frames which have hidden therein said watermark information inserted by said watermark-information insertion unit.

15. The watermark insertion device according to claim 1, further comprising:
copy-restriction-information insertion unit inserting copy restriction information which restricts copying of the moving image, into an area in which data controlling said moving image is recorded.

16. The watermark insertion device according to claim 15, wherein the copy restriction information is made detectable hardware-wise independently of said watermark information.

17. The watermark insertion device according to claim 15, wherein the copy restriction information is information indicative of any of a mode which permits the copying of said moving image any unrestricted number of times, a mode which permits said copying only once, a mode which rejects the new copying, and a mode which rejects said copying entirely.

18. The watermark insertion device according to claim 17, which is made applicable even to an apparatus free from any restriction on video recording, owing to the mode which permits said copying any number of times.

19. A watermark insertion device inserting watermark information into a moving image composed of a plurality of frames, comprising:
a frame selection unit selecting frames into which said watermark information is to be inserted, at irregular intervals from among the plurality of frames; and
a watermark-information insertion unit in communication with the frame selection unit and inserting said watermark information into the selected frames, wherein said frame selection unit selects the frames in a number of random number values generated under a controlled condition, every second prescribed number of frames.

20. A method of inserting watermark information into a moving image composed of a plurality of frames, comprising:
selecting frames into which the watermark information is to be inserted, at irregular intervals from among the plurality of frames;
deciding a color and a tonal density of a part of the moving image in inserting the watermark information, the image part surrounding that position in each of the selected frames at which the watermark information is to be inserted; and
inserting said watermark information whose color and tonal density have been adjusted in accordance with results of the decisions into the selected frames.

21. A method of inserting watermark information into a moving image composed of a plurality of frames, comprising:
selecting frames into which the watermark information is to be inserted, at irregular intervals from among the plurality of frames; and
inserting said watermark information into the selected frames, wherein said watermark information has a size which is large enough to visually perceive said watermark information when the moving image has been brought to a standstill.

22. The watermark insertion method according to claim 20,
wherein the insertion of said watermark information is done into the frames in a quantity in which said insertion of said watermark information is not recognizable in the moving image.

23. The watermark insertion method according to claim 20,
wherein information which restricts copying of the moving image is recorded together with said moving image in which said watermark information has been inserted.

24. A computer-readable storage medium used to direct a computer inserting watermark information into a moving image composed of a plurality of frames, to perform the operations of:
selecting frames into which the watermark information is to be inserted, at irregular intervals from among the plurality of frames;
deciding a color and a tonal density of a part of the moving image in inserting the watermark information, the image part surrounding that position in each of the selected frames at which the watermark information is to be inserted; and
inserting said watermark information whose color and tonal density have been adjusted in accordance with results of the decisions into the selected frames.

25. A machine-readable storage medium used to direct an apparatus storing a moving image composed of a plurality of frames, comprising:

visible watermark information, visually perceivable when said moving image is brought to a standstill, inserted into selected frames at irregular intervals from among the plurality of frames so that the visible watermark information is visually unperceivable in said moving image and adjusted in a color and a tonal density thereof in accordance with a color and a tonal density of a part of the moving image in inserting the visible watermark information, the image part surrounding that position in each of the selected frames at which the visible watermark information is to be inserted.

26. The storage medium according to claim 25, wherein copy restriction information indicative of a restrictive condition for copying of said moving image is inserted in that area of said moving image in which control data is recorded.

27. The watermark insertion device according to claim 1, wherein said frame selection unit selects a first prescribed number of frames, every second prescribed number of frames.

\* \* \* \* \*

UNITED STATES PATENT AND TRADEMARK OFFICE
CERTIFICATE OF CORRECTION

PATENT NO. : 6,700,989 B1
DATED : March 2, 2004
INVENTOR(S) : Hiroyasu Itoh et al.

It is certified that error appears in the above-identified patent and that said Letters Patent is hereby corrected as shown below:

<u>Title page,</u>
Item [56], References Cited, FOREIGN PATENT DOCUMENTS, insert
-- JP      639395     01/88 --

Signed and Sealed this

Twenty-ninth Day of June, 2004

JON W. DUDAS
*Acting Director of the United States Patent and Trademark Office*